(12) United States Patent
Langreck

(10) Patent No.: US 8,674,649 B2
(45) Date of Patent: *Mar. 18, 2014

(54) HIGH ACCELERATION ROTARY ACTUATOR

(71) Applicant: Gerald K. Langreck, Phillips, WI (US)

(72) Inventor: Gerald K. Langreck, Phillips, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,809

(22) Filed: Jun. 10, 2013

(65) Prior Publication Data

US 2013/0270947 A1    Oct. 17, 2013

Related U.S. Application Data

(63) Continuation of application No. 13/071,932, filed on Mar. 25, 2011, now Pat. No. 8,482,243.

(60) Provisional application No. 61/340,948, filed on Mar. 25, 2010.

(51) Int. Cl.
  *H02P 1/50* (2006.01)
  *H02P 6/00* (2006.01)

(52) U.S. Cl.
  USPC ........... 318/720; 318/116; 318/630; 318/632; 310/112; 310/114; 310/49.51; 310/257

(58) Field of Classification Search
  USPC ........... 318/400.01, 116, 119, 254, 599, 720, 318/630, 632; 310/112, 198, 257, 114, 310/49.51
  See application file for complete search history.

(56) References Cited

U.S. PATENT DOCUMENTS

| | | | | |
|---|---|---|---|---|
| 4,556,809 | A | * | 12/1985 | Beisse et al. .................. 310/114 |
| 4,820,951 | A | * | 4/1989 | Sugiura et al. ................ 310/257 |
| 6,137,199 | A | | 10/2000 | Lindsley |
| 6,223,416 | B1 | | 5/2001 | Boyd, Jr. et al. |
| 6,271,638 | B1 | * | 8/2001 | Erdman et al. ........... 318/400.01 |
| 6,348,752 | B1 | * | 2/2002 | Erdman et al. ......... 310/216.023 |
| 6,414,408 | B1 | * | 7/2002 | Erdman et al. ............. 310/68 R |
| 6,479,957 | B1 | * | 11/2002 | Erdman et al. ........... 318/400.22 |
| 6,707,292 | B2 | * | 3/2004 | Viola .......................... 324/207.2 |
| 6,765,321 | B2 | * | 7/2004 | Sakamoto .................. 310/49.08 |
| 6,956,312 | B2 | * | 10/2005 | Inayama et al. ......... 310/156.41 |

(Continued)

FOREIGN PATENT DOCUMENTS

WO    WO 2007/143827    12/2007

OTHER PUBLICATIONS

International Search Report dated Jun. 20, 2011, issued in International Application No. PCT/US11/29945.

*Primary Examiner* — Paul Ip
(74) *Attorney, Agent, or Firm* — Boardman & Clark LLP

(57) ABSTRACT

A high acceleration rotary actuator motor assembly is provided comprising a plurality of phase motor elements provided in tandem on a shaft, each phase element including a rotor carrying magnets which alternate exposed poles, the rotor being connected to the shaft and surrounded by a stator formed of a plurality of interconnected segmented stator elements having a contiguous winding to form four magnetic poles, the stator being in electrical communication with a phase electric drive unit, wherein each of the poles exert a magnetic force upon the magnets carried by the rotor when the poles are electrically charged by the phase electric drive unit. The rotors and magnets of each phase motor element are offset about the shaft from one another. In addition, the phase motor elements are electrically isolated from one another.

18 Claims, 14 Drawing Sheets

(56) References Cited

U.S. PATENT DOCUMENTS

| | | |
|---|---|---|
| 7,190,096 B2 * | 3/2007 | Blanding et al. .............. 310/112 |
| 7,714,466 B2 * | 5/2010 | Kitamura et al. .......... 310/49.51 |
| 7,714,475 B2 * | 5/2010 | Enomoto et al. ....... 310/216.067 |
| 7,791,244 B2 * | 9/2010 | Enomoto et al. .............. 310/257 |
| 7,834,494 B2 * | 11/2010 | Blanding et al. ............ 310/68 B |
| 8,283,827 B2 * | 10/2012 | Jones et al. .................. 310/112 |
| 8,283,831 B1 * | 10/2012 | Kaminsky et al. ............ 310/198 |
| 8,482,243 B2 | 7/2013 | Langreck |
| 2002/0067093 A1 | 6/2002 | Das |
| 2002/0125782 A1 | 9/2002 | Peachee et al. |
| 2002/0140208 A1 * | 10/2002 | Duvall ......................... 280/624 |
| 2003/0052638 A1 * | 3/2003 | Cohen et al. .................. 318/599 |
| 2003/0098660 A1 * | 5/2003 | Erdman et al. ................ 318/254 |
| 2004/0017186 A1 * | 1/2004 | Viola ........................ 324/207.2 |
| 2005/0269887 A1 * | 12/2005 | Blanding et al. .............. 310/112 |
| 2006/0113933 A1 * | 6/2006 | Blanding et al. .............. 318/116 |
| 2006/0208602 A1 * | 9/2006 | Enomoto et al. .............. 310/257 |
| 2006/0267439 A1 | 11/2006 | Rajasingham |
| 2007/0075605 A1 * | 4/2007 | Enomoto et al. .............. 310/257 |
| 2007/0295568 A1 * | 12/2007 | Vasilescu ..................... 188/267 |
| 2007/0296285 A1 * | 12/2007 | Enomoto et al. ........... 310/49 R |
| 2008/0018196 A1 * | 1/2008 | Enomoto et al. .............. 310/257 |
| 2008/0067889 A1 * | 3/2008 | Enomoto et al. .............. 310/257 |
| 2009/0021089 A1 | 1/2009 | Nashiki |

* cited by examiner

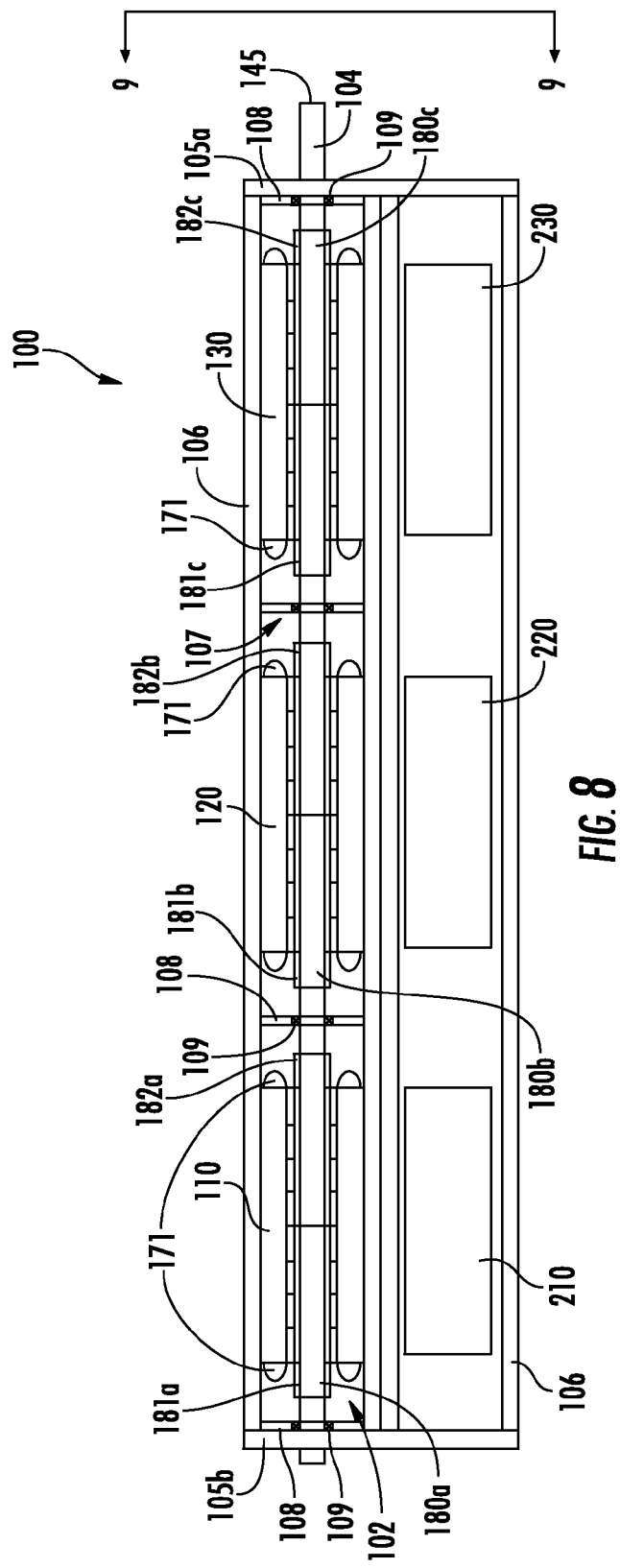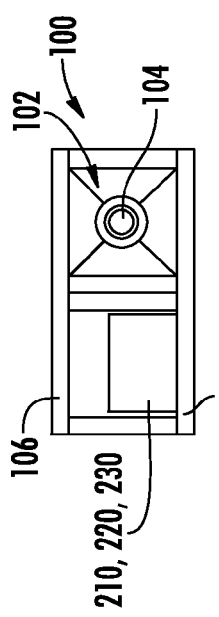

HIGH ACCELERATION ROTARY ACTUATOR

CROSS-REFERENCE TO RELATED APPLICATIONS

This application claims priority as a continuation application of U.S. patent application Ser. No. 13/071,932, filed Mar. 25, 2011, entitled HIGH ACCELERATION ROTARY ACTUATOR, which claims priority from U.S. Provisional Application Ser. No. 61/340,948, filed Mar. 25, 2010, entitled HIGH ACCELERATION ROTARY ACTUATOR, the contents of which is hereby incorporated by reference in its entirety.

FIELD OF THE INVENTION

The present invention relates to a servo motor system. The present invention more specifically relates to a multi-phase tandem servo motor assembly for generating high torque at a reduced inertia.

BACKGROUND

Servo motors are generally known in the art. A servo motor is an electromechanical device in which an electrical input determines a mechanical output, for example the rotational velocity and torque of a corresponding motor shaft. A servo motor generally includes a rotor surrounded by a nonmoving stator. Winding, or coils of wire, are positioned on the stator. Electrical currents are provided to the winding, producing a rotating magnetic field. The rotating magnetic field interacts with the rotor, causing the rotor to turn. The electrical current is generally provided by a drive. The drive can control the amount of electrical current transmitted to the motor, correspondingly controlling the rotation of the motor shaft. Such drives may be referred to as variable-speed or variable-frequency drives.

It is desired for some end uses of a servo motor to have a high torque to low inertia ratio. A servo motor having a high torque to low inertia ratio provides a fast rate of acceleration of the motor rotor. However, servo motors as described above have limitations on the torque to inertia ratio, especially in applications requiring a larger sized motor. This is due to the larger, higher weight motor and components necessary to rotate a rotor at higher speeds or revolutions per minute (RPM).

In addition, it is desired for some end uses of a servo motor to operate with a higher power density in a smaller overall motor package. A higher power density provides for an increase in efficiency of the servo motor. However, servo motors as described above have limitations in increasing power density and efficiency. One reason includes an increase in winding resistance from end turn waste, effectively reducing stator slot fill. End turns of traditionally wound motors do not provide power or torque, but instead generate unnecessary heat, leading to a reduction of motor efficiency. End turns of the servo motors described above are also susceptible to heat damage, voltage damage, and insulation breakdown due to the buildup of heat at the end turns. The end turns are generally surrounded by air and don't include an adequate thermal path for heat to escape. This can lead to damage to the winding, including a short which can render the servo motor inoperable.

Accordingly, an improved servo motor assembly having an improved electronic current driving system is provided.

SUMMARY OF THE INVENTION

A high acceleration rotary actuator motor assembly is provided which comprises a first phase motor element provided on a shaft, the first phase element including a first rotor carrying four magnets which alternate exposed poles, the first rotor being connected to the shaft and surrounded by a first stator formed of a plurality of interconnected segmented stator elements having a contiguous winding to form four magnetic poles, the first stator being in electrical communication with a first phase electric drive unit, wherein each of the poles exert a magnetic force upon the four magnets carried by the first rotor when the poles are electrically charged by the first phase electric drive unit. A second phase motor element is provided on the shaft a first distance from the first phase motor element, the second phase motor element including a second rotor carrying four magnets which alternate exposed poles, the second rotor being connected to the shaft and surrounded by a second stator formed of a plurality of interconnected segmented stator elements having a contiguous winding to form four magnetic poles, the second stator being in electrical communication with a second phase electric drive unit, wherein each of the poles exert a magnetic force upon the four magnets carried by the second rotor when the poles are electrically charged by the second phase electric drive unit. A third phase motor element is provided on the shaft a second distance from the second phase motor element, the third phase motor element including a third rotor carrying four magnets which alternate exposed poles, the third rotor being connected to the shaft and surrounded by a third stator formed of a plurality of interconnected segmented stator elements having a contiguous winding to form four magnetic poles, the third stator being in electrical communication with a third phase electric drive unit, wherein each of the poles exert a magnetic force upon the four magnets carried by the third rotor when the poles are electrically charged by the third phase electric drive unit. The second rotor and magnets are offset about the shaft from the first rotor and magnets by thirty degrees of rotation, while the third rotor and magnets being offset about the shaft from the first rotor and magnets by sixty degrees of rotation. In addition, the first, second and third phase elements are electrically isolated from one another.

In another embodiment of a high acceleration rotary actuator motor assembly, the assembly comprises a shaft carrying a first phase motor element spaced a first distance from a second phase motor element, a third phase motor element spaced a second distance from the second phase motor element, and a fourth phase motor element spaced a third distance from the third phase motor element, each motor element including a square stator formed of four interconnecting segmented stator elements, each segmented stator element including a longitudinal member and a perpendicular member connected as a unitary element, the longitudinal member having parallel sides spaced apart by first and second ends, the perpendicular member being orthogonal to the longitudinal member and having an arcuate end opposite the longitudinal member, the first end defines a receiving aperture and the second end includes an attachment post, wherein the receiving aperture is adapted to receive the receiving post of a second segmented stator element and the attachment post is adapted to be received by the receiving aperture of a third segmented stator element. A four pole winding is provided in each stator of each phase motor element. A first rotor is connected to the shaft in the first phase motor element, a second rotor is connected to the shaft in the second phase motor element, the second rotor being provided on the shaft $\pi/8$ radians offset from the first rotor, a third rotor is connected to the shaft in the third phase motor element, the third rotor being provided on the shaft $\pi/4$ radians offset from the first rotor, and a fourth rotor is connected to the shaft in the fourth phase motor element, the fourth rotor being provided on the shaft 3π/8 radians offset from the first rotor.

In another embodiment of a high acceleration rotary actuator motor assembly, the assembly comprises a shaft carrying a first phase motor element, a second phase motor element, and a third phase motor element provided in tandem on the shaft, each motor element including a square stator formed of four interconnecting segmented stator elements, each segmented stator element including a longitudinal member and a perpendicular member connected as a unitary element, the longitudinal member having parallel sides spaced apart by first and second ends, the perpendicular member being orthogonal to the longitudinal member and having an arcuate end opposite the longitudinal member, the first end defines a receiving aperture and the second end includes an attachment post, wherein the receiving aperture is adapted to receive the receiving post of a second segmented stator element and the attachment post is adapted to be received by the receiving aperture of a third segmented stator element. A four pole winding is provided in each stator of each phase motor element. A first rotor is connected to the shaft in the first phase motor element, the first rotor carrying four permanent magnets of a uniform radius and alternating in exposed pole around the shaft. A second rotor is connected to the shaft in the second phase motor element, the second rotor carrying four permanent magnets of a uniform radius and alternating in exposed pole around the shaft, the permanent magnets of the second rotor being provided on the shaft π/6 radians offset from the magnets of the first rotor. A third rotor is connected to the shaft in the third phase motor element, the third rotor carrying four permanent magnets of a uniform radius and alternating in exposed pole around the shaft, the permanent magnets of the third rotor being provided on the shaft π/3 radians offset from the magnets of the first rotor.

BRIEF DESCRIPTION OF THE DRAWINGS

FIG. 8 is an overhead plan view of one or more examples of embodiments of the high acceleration rotary actuator assembly of FIG. 1.

FIG. 9 is an end view of the high acceleration rotary actuator assembly of FIG. 8 with the end bell removed, showing one or more electronic drive units in association with the multi-phase tandem rotor servo motor assembly taken along line 9-9 of FIG. 8.

DETAILED DESCRIPTION

Figure 1:
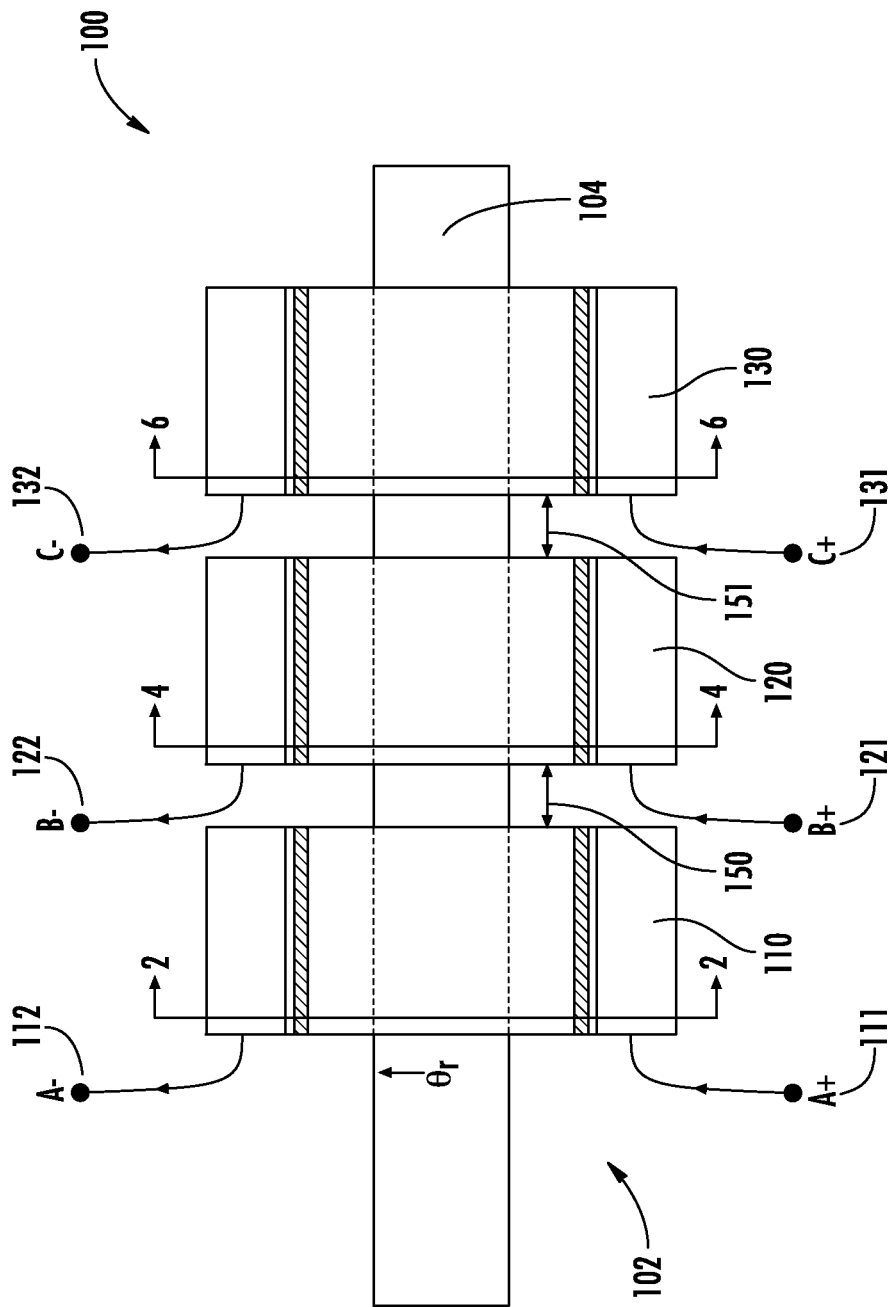
FIG. 1 is a plan view according to one or more examples of embodiments of a high acceleration rotary actuator assembly, showing the rotor and stator assemblies.

The invention shown in the Figures is generally directed to a high acceleration rotary actuator assembly 100, 200, and in particular a multi-phase tandem rotor servo motor assembly 102 having a plurality of electrically isolated phase motor elements 110, 120, 130, 140 formed of a plurality of segmented stator elements 160 and provided in tandem upon a common shaft 104. For ease of discussion and understanding, the following detailed description and illustrations refer to each phase element 110, 120, 130, 140 of the multi-phase tandem rotor servo motor 102 as a permanent magnet motor. It should be appreciated that a permanent magnet motor is provided for purposes of illustration, and that the multi-phase tandem rotor servo motor 102 and associated phase elements 110, 120, 130, 140 disclosed herein may be employed as a different type of motor, including, but not limited to, a reluctance motor or induction motor.

FIG. 1 is a plan view of an embodiment of a high acceleration rotary actuator assembly 100. The high acceleration rotary actuator assembly 100 generally includes a multi-phase tandem rotor servo motor assembly 102. The multi-phase tandem rotor servo motor 102 may include a plurality of phases. For example, in the embodiment illustrated in FIG. 1, the multi-phase tandem rotor servo motor 102 may include three phases which are separated into three phase motor elements, a first or A phase motor element 110, a second or B phase motor element 120, and a third or C phase motor element 130. Each phase motor element 110, 120, 130 includes a respective input terminal connection or input lead 111, 121, 131, which conveys an electrical current to each phase motor element 110, 120, 130 from a corresponding electronic drive unit 210, 220, 230 (see FIG. 8). Each phase motor element 110, 120, 130 additionally includes a respective output terminal connection or output lead 112, 122, 132 which conveys an electrical current out of or away from each phase motor element 110, 120, 130 to a corresponding electronic drive unit 210, 220, 230 (see FIG. 8). The input/output terminal connections 111/112, 121/122, 131/132 for each phase motor element 110, 120, 130 are electrically isolated from one another. In other words, the output terminal connections 112, 122, 132 are not tied together to form a neutral point. By electrically isolating the terminal connections for each phase motor element 110, 120, 130, each phase electronic drive unit 210, 220, 230 may more readily realize the desired optimum current waveform for each respective phase motor element 110, 120, 130. This in turn may assist in the realization of a high torque to inertia ratio servo motor in accordance with the high acceleration rotary actuator assembly 100 as disclosed herein.

The multi-phase tandem rotor servo motor 102 also includes a low inertia, common shaft 104. The low inertia shaft 104 has a lower inertia than shafts or rotors of comparable motors, as shaft 104 has a longer length and smaller diameter due to the tandem arrangement of the phase motor elements 110, 120, 130. Each phase motor element 110, 120, 130 is mounted on or connected in tandem to shaft 104. As shown in FIG. 1, when connected to shaft 104, each phase motor element 110, 120, 130 may be spaced or separated from one another by a distance 150, 151. For example, the first phase motor element 110 may be separated from the second stator phase element 120 by a first distance or gap or spacing 150. Similarly, the second phase motor element 120 may be separated from the third phase motor element 130 by a second distance or gap or spacing 151. In one or more examples of embodiments, the phase motor elements 110, 120, 130 may be provided in tandem on shaft 104 with minimal to no spacing 150, 151 between the respective phase motor elements 110, 120, 130.

The high acceleration rotary actuator assembly 100 of FIG. 1 may also include end bells 105 (not shown in FIG. 1), a casing or heat shrink tube 106 (not shown in FIG. 1) which encases or surrounds the multi-phase tandem rotor servo motor 102, and one or more bearing assembly 107 (not shown in FIG. 1) which may include a bearing support or holder 108 and one or more associated bearings 109 (not shown in FIG. 1).

Figure 2:
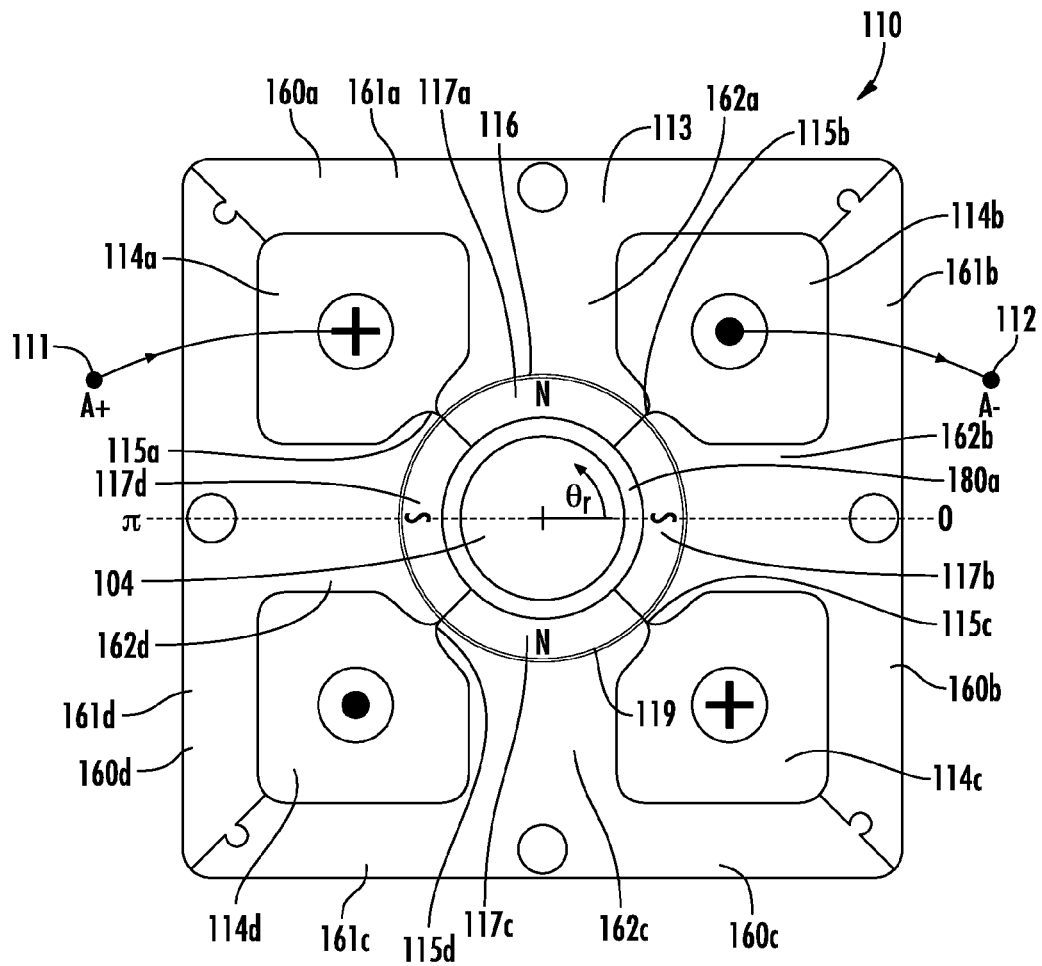
FIG. 2 is a cross-sectional view of a section of the high acceleration rotary actuator assembly of FIG. 1, showing a first phase motor element taken along line 2-2 of FIG. 1.

FIG. 2 illustrates a cross-sectional view of the first phase motor element 110. The first phase motor element 110 includes a plurality of interconnected stator segments or stator lamination segments or segmented stator elements 160. As illustrated in FIG. 2, the first phase motor element 110 includes interconnected stator segments 160a, 160b, 160c, 160d. Each stator segment 160a, 160b, 160c, 160 d is provided approximately orthogonal to or at an approximate ninety (90) degree angle to each of the neighboring stator segments 160a, 160b, 160c, 160d. The interconnected stator segments 160a, 160b, 160c, 160 d form an approximately square stator lamination 113. While FIG. 2 illustrates the cross-section of a single stator lamination 113, the first phase motor element 110 may include a stack or series or plurality of stator laminations 113. For example, in various embodiments, a plurality of stator laminations 113 may be stacked upon each other to form the first phase motor element 110.

Each stator segment 160 may include a longitudinal member 161 and a perpendicular member 162. Referring to FIG. 2, each of the interconnected stator segments 160a, 160b, 160c, 160d respectively includes a longitudinal member or back iron 161a, 161b, 161c, 161d and a perpendicular member 162a, 162b, 162c, 162d. The stator lamination 113 and associated longitudinal members or back iron 161 are illustrated in FIG. 2 as arranged in an approximate square shaped configuration. An approximate square shaped configuration provides advantages over standard circular stator lamination and/or back iron arrangements. An approximate square shaped configuration provides a greater or increased amount of back iron 161 in the stator lamination 113 than a standard circular stator lamination. This may allow for an increased amount of conductive material or winding (not shown) to be wound about each stator segment 160. Further, the square shaped configuration of the interconnected stator segments 160 allows for a larger slot 114 area. This may allow for an increased amount of conductive material or winding (not shown) to be wound about each stator segment 160 and placed in or through slots 114 than a standard circular stator lamination, advantageously reducing heat generation for a given torque and allowing for a higher torque and torque to inertia ratio. Further, slots 114 may be provided toward the corners of the stator lamination 113, providing for a reduction in heat build-up in the stator lamination 113 due to the improved heat transfer or heat dissipation or cooling. In various embodiments, the stator lamination 113 may be rectangular or any other polygonal arrangement which provides for an increased amount of back iron 161 in the stator lamination 113 than a standard circular stator lamination. Stator lamination 113 may be formed from iron, steel, a combination of iron and silicon, silicon steel, metallic alloys, laminates or by any other known and suitable materials, processes or methods.

The interconnected stator segments 160a, 160b, 160c, 160d define a plurality of slots or winding slots or corner slots 114. Referring to FIG. 2, the illustrated interconnected stator segments 160a, 160b, 160c, 160d define slots 114a, 114b, 114c, 114d. Each slot 114 corresponds with one of four poles of the multi-phase tandem servo motor 102. Accordingly, the four slots 114a, 114b, 114c, 114d define a four pole winding, for example a four pole concentrated winding. The four slots 114a, 114b, 114c, 114d are provided in an arrangement approximately orthogonal or perpendicular to one another. For example, as shown in FIG. 2, slot 114a is neighbored by slots 114b and 114d, both of which are provided approximately orthogonal to corner slot 114a. Similarly, slot 114b is neighbored by slots 114a and 114c, both of which are provided approximately orthogonal to corner slot 114b. Slot 114c is neighbored by slots 114b and 114d, both of which are provided approximately orthogonal to corner slot 114c. Slot 114d is neighbored by slots 114c and 114a, both of which are provided approximately orthogonal to corner slot 114d. To this end, the slots 114a, 114b, 114c, 114d are provided in relation to one another to approximately form the corners of a square. Each slot 114a, 114b, 114c, 114d alternates with its neighboring slot between carrying an electrical current into the slot or carrying an electrical current out of the slot through the respective winding (not shown) wound about each stator segment 160a, 160b, 160c, 160d. As illustrated in FIG. 2, slots 114a and 114c carry an electrical current into the respective slots, which is illustrated by a "+" or plus, while slots 114b and 114d carry an electrical current out of the respective slots, which is illustrated by a "•" or dot. In addition, slot 114a receives the first input terminal connection 111, while the first output terminal connection 112 exits from slot 114b. In one or more examples of embodiments, slots 114 may be circular, square, rectangular, or any other polygonal arrangement or appropriate size to maximize conductive material or winding in accordance with the present invention.

The interconnected stator segments 160a, 160b, 160c, 160d may define one or more slot necks or slot passages 115. Referring to FIG. 2, each slot 114a, 114b, 114c, 114d includes a slot neck 115a, 115b, 115c, 115d. Each slot neck 115 is defined by the perpendicular members 162 of the respective interconnected stator segments 160a, 160b, 160c, 160d bordering the respective slot 114. For example, slot neck 115a is defined by perpendicular members 162a, 162d. Each slot neck 115 interconnects the slot 114 and the rotor aperture 116.

The interconnected stator segments 160a, 160b, 160c, 160d may define a rotor aperture 116. The rotor aperture 116 may be in communication with corner slots 114a, 114b, 114c, 114d, for example, as illustrated in FIG. 2, through slot openings 115a, 115b, 115c, 115d. In addition, rotor aperture 116 receives or surrounds shaft 104.

Within rotor aperture 116, shaft 104 carries rotor or tandem rotor or first rotor 180a. Mounted upon or connected to rotor 180a is a plurality of magnets 117. Referring to FIG. 2, rotor 105a may carry four magnets 117a, 117b, 117c, 117d. Magnets 117a, 117b, 117c, 117d are respectively provided about a portion of the circumference of rotor 180a. In various embodiments, and as illustrated in FIG. 2, the four magnets 117a, 117b, 117c, 117d are each permanent magnets which are a full 90° (ninety degree) shape. In other words, the four magnets 117a, 117b, 117c, 117d each extend along one-quarter of the circumference of the rotor 180a or for 90° (ninety degrees) of the radius of shaft 104 and rotor 180a. Each neighboring magnet 117a, 117b, 117c, 117d alternates its exposed pole, or pole opposite the rotor side of the magnet, about the circumference of rotor 180a. For example, magnets 117a, 117b, 117c, 117d include alternating poles, where magnets 117a and 117c expose a north pole, which is illustrated by an "N", while magnets 117b and 117d expose a south pole, which is illustrated by an "S". In addition, magnets 117a, 117b, 117c, 117d abut or border or communicate with each respective neighboring magnet 117. To this end, magnets 117a, 117b, 117c, 117d have the same thickness radially outward from shaft 104. In other words, magnets 117a, 117b, 117c, 117d have a uniform or a continuous thickness about the circumference of rotor 180a. The shaft 104, rotor 180a and associated magnets 117a, 117b, 117c, 117d are spaced a distance from rotor aperture 116 by an air gap 119. The air gap 119 enables the shaft 104, rotor 180a and magnets 117a, 117b, 117c, 117d to rotate unobstructed within the rotor aperture 116. As observed from the cross-sectional view of FIG. 2, the shaft 104, rotor 180a and magnets 117a, 117b, 117c, 117d rotate counter-clockwise within rotor aperture 116. In one or more examples of embodiments, magnets 117 may include angled edges, tapered edges, or any suitable edge for operation of the high acceleration rotary actuator assembly 100 in accordance with the present invention.

Figure 3:
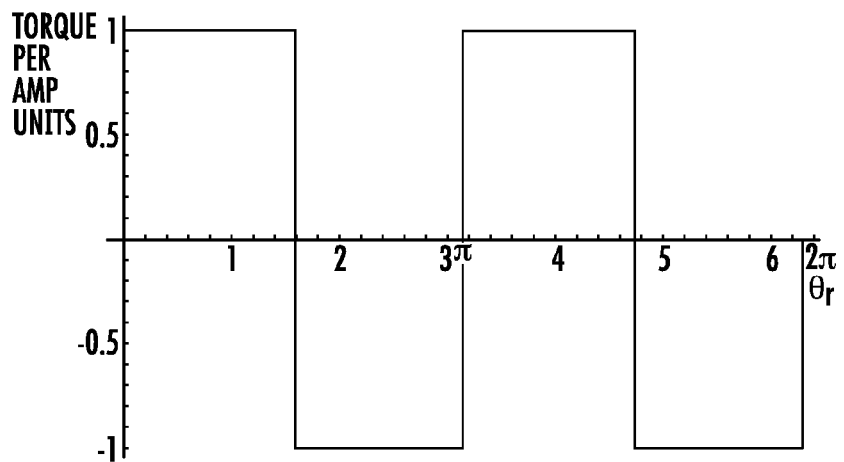
FIG. 3 is a graph showing the torque per amp versus rotor angle for one revolution of the rotor provided in the first phase motor element of FIG. 2.

FIG. 3 illustrates a graphical representation of the angle of rotation of the rotor, $\theta_r$ (X-axis) versus the torque per amp (Y-axis) for one revolution of rotor 180a about the rotor aperture 116 of the first phase motor element 110. The torque per amp versus rotor angle of the first phase motor element 110 is in the shape of a square or approximate square wave. The square wave is generated by the continuous or uniform thickness of magnets 117 about rotor 180a in air gap 119 of the rotor aperture 116. Based upon the four magnetic poles (or two pole pairs) of the first phase motor element 110, the torque per amp versus rotor angle completes two electrical cycles for every one revolution or 360° (three-hundred and sixty degrees) of rotation of rotor 180a. The first electrical cycle is completed at 180° (one-hundred and eighty degrees) or π (pie) radians of rotation of rotor 180a, while the second electrical cycle is completed at 360° (three-hundred and sixty degrees) or 2π (two pie) radians of rotation of rotor 180a.

Figure 4:
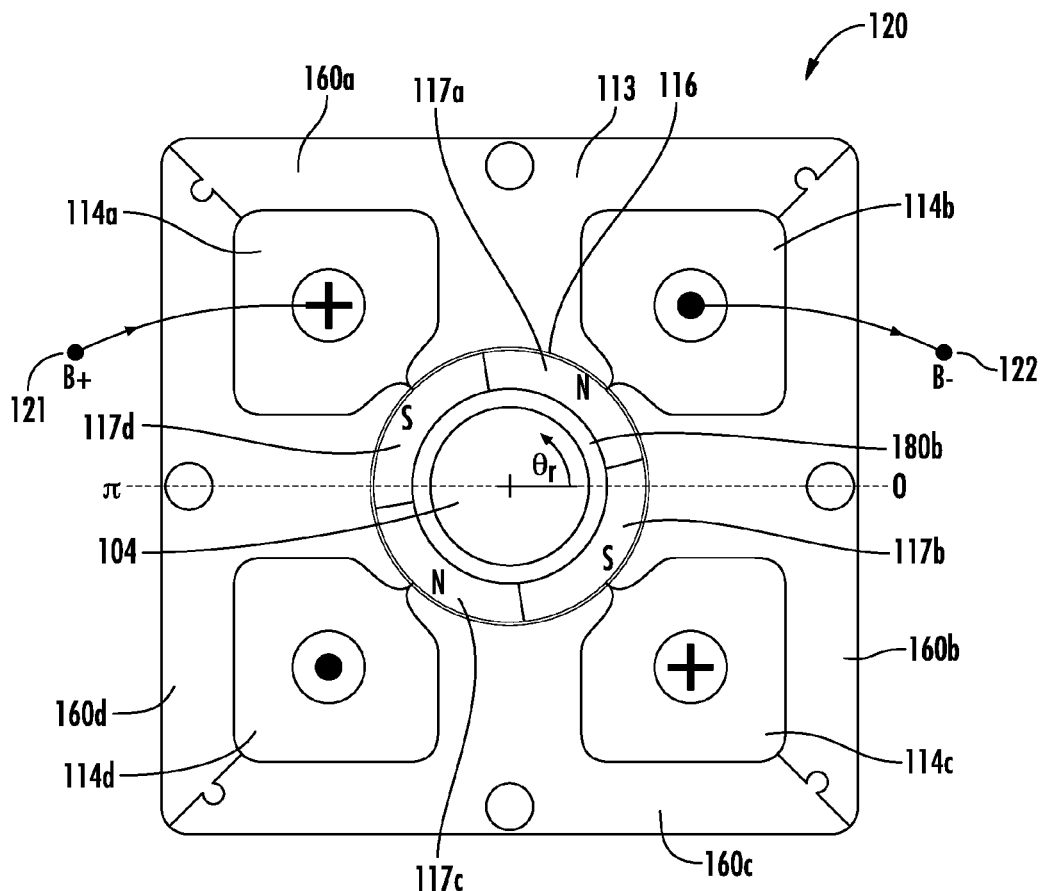
FIG. 4 is a cross-sectional view of a section of the high acceleration rotary actuator assembly of FIG. 1, showing a second phase motor element taken along line 4-4 of FIG. 1.

FIG. 4 illustrates a cross-sectional view of the second phase motor element 120 of the multi-phase tandem rotor servo motor assembly 102. The second phase motor element 120 includes a plurality of interconnected stator segments 160a, 160b, 160c, 160d, an approximately square stator lamination 113, a plurality of slots 114, slot necks 115, rotor aperture 116, magnets 117 and air gap 119 which are substantially as described herein in association with the first phase motor element 110. Operation and particular components described herein are substantially the same and like numbers have been used to illustrate the like components. Slot 114a of the second phase motor element 120 receives the second input terminal connection 121, while the second output terminal connection 122 exits from slot 114b. Within the rotor aperture 116 of the second phase motor element 120, common shaft 104 carries rotor 180b. Mounted upon or connected to rotor 180b is a plurality of magnets 117. As illustrated in FIG. 4, rotor 180b carries four magnets 117a, 117b, 117c, 117d. Rotor 180b and the attached magnets 117a, 117b, 117c, 117d are substantially the same as those described in association with rotor 180a, but for the positioning of rotor 180b in relation to rotor 180a on shaft 104. Rotor 180b is provided on shaft 104 approximately 30° (thirty degrees) mechanically lagging from rotor 180a. In other words, comparing the cross-sectional view of the first phase motor element 110 of FIG. 2 to the cross-sectional view of the second phase motor element 120 of FIG. 4, rotor 180b (and the associated magnets 117) is illustrated as offset or rotated from rotor 180a (and the associated magnets 117) by approximately 30° (thirty degrees) lagging. Put differently, according to the illustrated view of FIG. 4, rotor 180b (and the associated magnets 117) is disposed about shaft 104 approximately 30° (thirty degrees) in the clockwise direction as compared to rotor 180a (of FIG. 2), as FIGS. 2 and 4 illustrate the rotation of shaft 104 as in the counter-clockwise direction. In addition to rotor 180b mechanically lagging rotor 180a by approximately 30° (thirty degrees), rotor 180b has an electrical angle which is lagging rotor 180a by approximately 60° (sixty degrees). The associated electrical angle of rotor 180b can be calculated by multiplying the mechanical angle by N, where N equals the number of pole pairs (or one-half the total number of poles).

Figure 5:
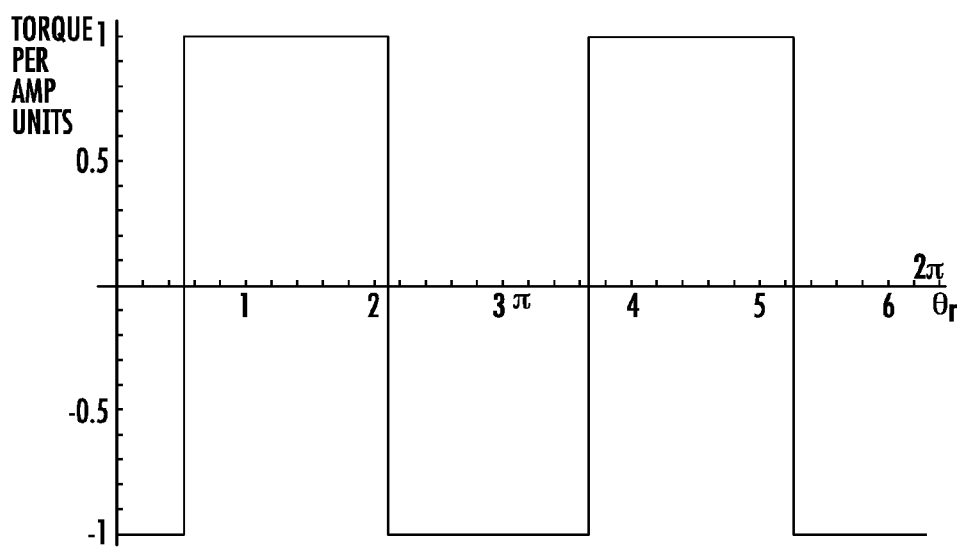
FIG. 5 is a graph showing the torque per amp versus rotor angle for one revolution of the rotor provided in the second phase motor element of FIG. 4.

FIG. 5 illustrates a graphical representation of the angle of rotation of the rotor, $\theta_r$ (X-axis) versus the torque per amp (Y-axis) for one revolution of rotor 180b about the rotor aperture 116 of the second phase motor element 120. The torque per amp versus rotor angle of the second phase motor element 120 is in the shape of a square or approximate square wave. The square wave is generated by the continuous or uniform thickness of magnets 117 about rotor 180b in air gap 119 of the rotor aperture 116. Based upon the four magnetic poles (or two pole pairs) of the second phase motor element 120, the torque per amp versus rotor angle completes two electrical cycles for every one revolution or 360° (three-hundred and sixty degrees) of rotation of rotor 180*b*. The first electrical cycle is completed at 180° (one-hundred and eighty degrees) or π (pie) radians of rotation of rotor 180*b*, while the second electrical cycle is completed at 360° (three-hundred and sixty degrees) or 2π (two pie) radians of rotation of rotor 180*b*. Comparing torque per amp versus rotor angle of FIG. 5 to FIG. 3, the torque per amp of FIG. 5 is shifted 30° (thirty degrees) mechanically lagging to the torque per amp of FIG. 3. In other words, the torque per amp curve of FIG. 5 is shifted π/6 radians to the right as compared to the torque per amp curve of FIG. 3. This is due to rotor 180*b* being rotated about shaft 104 30° (thirty degrees) behind, or lagging, rotor 180*a*.

Figure 6:
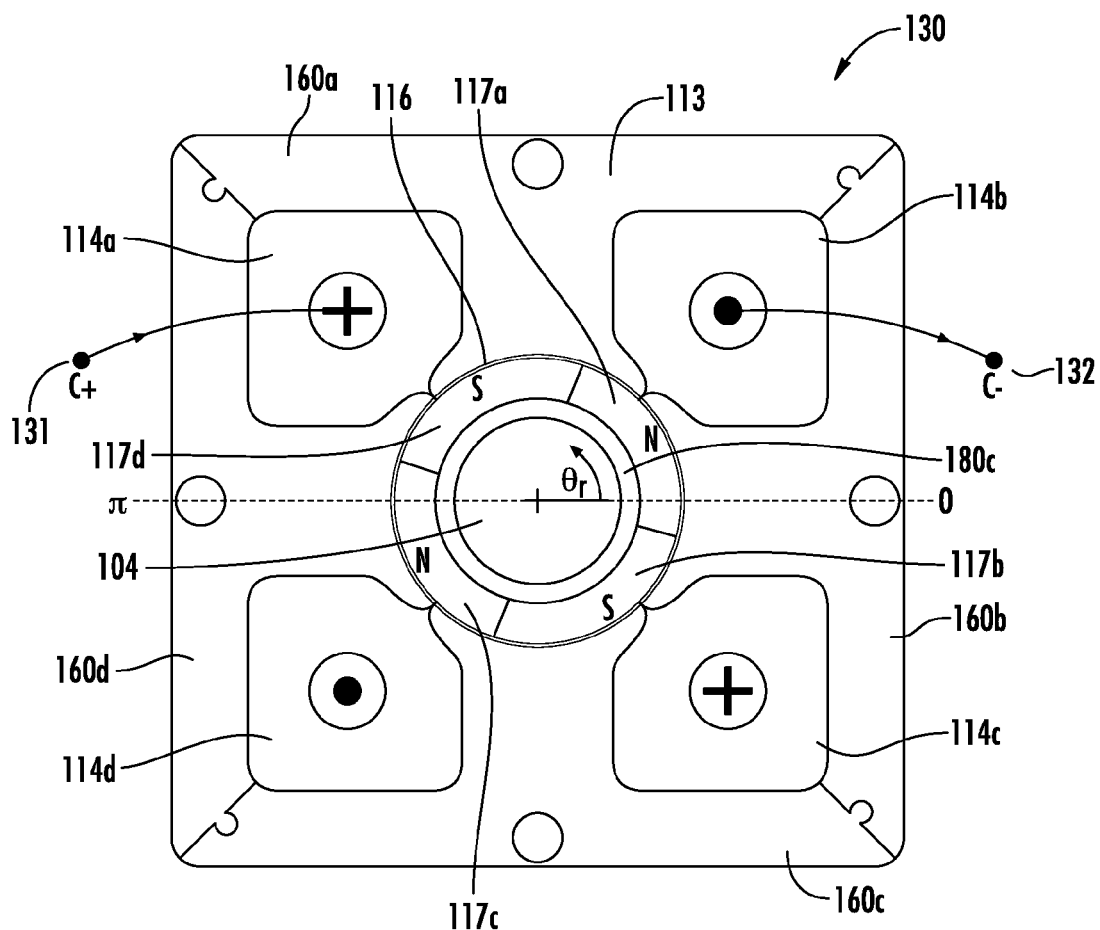
FIG. 6 is a cross-sectional view of a section of the high acceleration rotary actuator assembly of FIG. 1, showing a third phase motor element taken along line 6-6 of FIG. 1.

FIG. 6 illustrates a cross-sectional view of the third phase motor element 130 of the multi-phase tandem rotor servo motor assembly 102. The third phase motor element 130 includes a plurality of interconnected stator segments 160*a*, 160*b*, 160*c*, 160*d*, an approximately square stator lamination 113, a plurality of slots 114, slot necks 115, rotor aperture 116, magnets 117 and air gap 119 which are substantially as described herein in association with the first phase motor element 110. Operation and particular components described herein are substantially the same and like numbers have been used to illustrate the like components. Slot 114*a* of the third phase motor element 130 receives the third input terminal connection 131, while the third output terminal connection 132 exits from slot 114*b*. Within the rotor aperture 116 of the third phase motor element 130, common shaft 104 carries rotor 180*c*. Mounted upon or connected to rotor 180*c* is a plurality of magnets 117. As illustrated in FIG. 6, rotor 180*c* carries four magnets 117*a*, 117*b*, 117*c*, 117*d*. Rotor 180*c* and the attached magnets 117*a*, 117*b*, 117*c*, 117*d* are substantially the same as those described in association with rotor 180*a*, but for the positioning of rotor 180*c* in relation to rotor 180*a* on shaft 104. Rotor 180*c* is provided on shaft 104 approximately 60° (sixty degrees) mechanically lagging from rotor 180*a*. In other words, comparing the cross-sectional view of the first phase motor element 110 of FIG. 2 to the cross-sectional view of the third phase motor element 130 of FIG. 6, rotor 180*c* (and the associated magnets 117) is illustrated as offset or rotated from rotor 180*a* (and the associated magnets 117) by approximately 60° (sixty degrees) lagging. Put differently, according to the illustrated view of FIG. 6, rotor 180*c* (and the associated magnets 117) is disposed about shaft 104 approximately 60° (sixty degrees) in the clockwise direction as compared to rotor 180*a* (of FIG. 2), as FIGS. 2 and 6 illustrate the rotation of shaft 104 as in the counterclockwise direction. In addition to rotor 180*c* mechanically lagging rotor 180*a* by approximately 60° (sixty degrees), rotor 180*c* has an electrical angle which is lagging rotor 180*a* by approximately 120° (one hundred and twenty degrees). The associated electrical angle of rotor 180*c* can be calculated by multiplying the mechanical angle by N, where N equals the number of pole pairs (or one-half the total number of poles).

Figure 7:
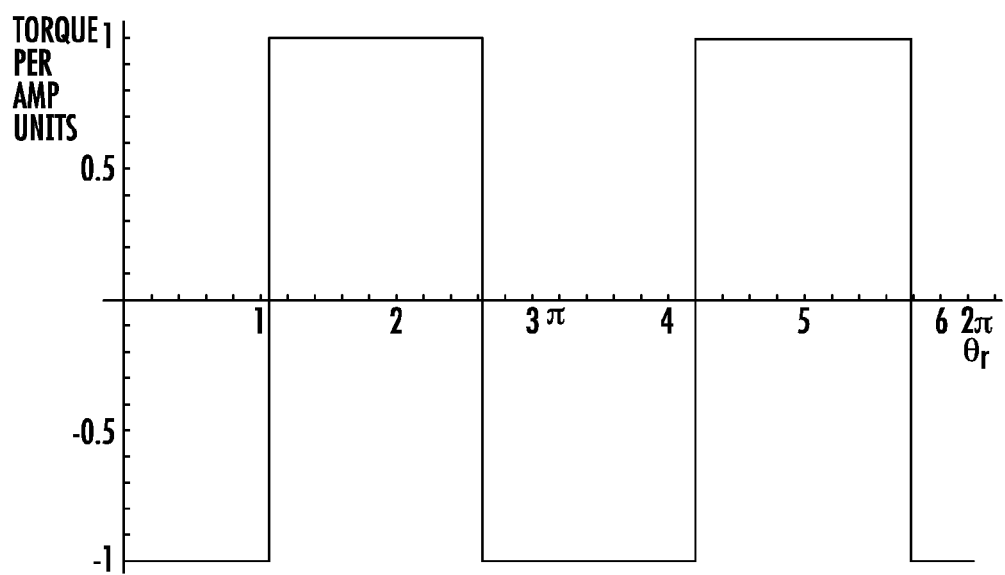
FIG. 7 is a graph showing the torque per amp versus rotor angle for one revolution of the rotor provided in the third phase motor element of FIG. 6.

FIG. 7 illustrates a graphical representation of the angle of rotation of the rotor, $\theta_r$, (X-axis) versus the torque per amp (Y-axis) for one revolution of rotor 180*c* about the rotor aperture 116 of the third phase motor element 130. The torque per amp versus rotor angle of the third phase motor element 130 is in the shape of a square or approximate square wave. The square wave is generated by the continuous or uniform thickness of magnets 117 about rotor 180*c* in air gap 119 of the rotor aperture 116. Based upon the four magnetic poles (or two pole pairs) of the third phase motor element 130, the torque per amp versus rotor angle completes two electrical cycles for every one revolution of rotor 180*c*. The first electrical cycle is completed at 180° (one-hundred and eighty degrees) or π (pie) radians of rotation of rotor 180*c*, while the second electrical cycle is completed at 360° (three-hundred and sixty degrees) or 2π (two pie) radians of rotation of rotor 180*c*d. Comparing torque per amp versus rotor angle of FIG. 7 to FIG. 3, the torque per amp of FIG. 7 is shifted 60° (sixty degrees) mechanically lagging to the torque per amp of FIG. 3. In other words, the torque per amp curve of FIG. 7 is shifted π/3 radians to the right as compared to the torque per amp curve of FIG. 3. This is due to rotor 180*c* being rotated about shaft 104 60° (sixty degrees) behind, or lagging, rotor 180*a*.

FIG. 8 is an overhead view of one or more examples of embodiments of the high acceleration rotary actuator assembly 100. Referring to FIG. 8, the high acceleration rotary actuator assembly 100 includes the multi-phase tandem rotor servo motor assembly 102 encased or surrounded by a casing or heat shrink tube 106. Shaft 104 is provided through a portion of casing 106. Shaft 104 may include an end 145 adapted to engage or connect to a drive shaft or other component for the transmission of torque and/or rotational force from the high acceleration rotary actuator assembly 100 to a desired assembly, for example a drive train, a pump, or other suitable mechanical assembly. End bells 105, for example a first end bell 105*a* and a second end bell 105*b*, may be provided on either end of shaft 104 and casing 106. Phase motor elements 110, 120, 130 may be mounted on or about a portion of shaft 104. The phase motor elements 110, 120, 130 are substantially as described herein in association with the phase motor elements 110, 120, 130 illustrated in FIGS. 2-7. Operation and particular components described herein are substantially the same and like numbers have been used to illustrate the like components. The phase motor elements 110, 120, 130 may include winding (not shown) having winding end turns 171. Rotors 180*a*, 180*b*, 180*c* are provided on shaft 104 in association with each respective phase motor element 110, 120, 130. Each rotor 180 may include magnet assemblies 181, 182. The magnet assemblies 181, 182 may be mounted upon or connected to rotor 180 and each may include a plurality of magnets 117. For example, each magnet assembly 181*a*/182*a*, 181*b*/182*b*, 181*c*/182*c* may include four magnets 117*a*, 117*b*, 117*c*, 117*d*, substantially as described herein in association with the phase motor elements 110, 120, 130 illustrated in FIGS. 2-7.

The multi-phase tandem rotor servo motor assembly 102 may include a bearing assembly 107. The bearing assembly 107 may include a bearing holder 108 and a bearing 109. As illustrated in FIG. 8, a plurality of bearing assemblies 107 are provided on rotor 104, one between each phase motor element 110, 120, 130 and one on each end of the casing 106 in association with end bells 105*a*,*b*. In one or more examples of embodiments, the multi-phase tandem rotor servo motor assembly 102 may include only a single bearing assembly 107, bearing holder 108 and/or bearing 109. Further, it should be appreciated in one or more examples of embodiments that the multi-phase tandem rotor servo motor assembly 102 may not include any bearing assemblies 107, bearing holders 108 and/or bearings 109.

As illustrated in FIG. 8, the high acceleration rotary actuator assembly 100 may include a plurality of electronic drive units 210, 220, 230. Each drive unit 210, 220, 230 is respectively in communication with an associated phase motor element 110, 120, 130 through input/output terminal connections 111/112, 121/122, 131/132 (see FIG. 1). Each phase motor element 110, 120, 130 and the associated drive unit 210, 220, 230 is electrically isolated from one another. For example, input terminal connection 111 is in communication with the first or A phase drive unit 210 to convey an electrical current of a first phase from the drive unit 210 to the first or A phase motor element 110. Output terminal connection 112 is in communication with drive unit 210 to convey an electrical current from the first phase motor element 110 to the drive unit 210. Input terminal connection 121 is in communication with second or B phase drive unit 220 to convey an electrical current of a second phase from the drive unit 220 to the second or B phase motor element 120. Output terminal connection 122 is in communication with drive unit 220 to convey an electrical current from the second phase motor element 120 to the drive unit 220. Input terminal connection 131 is in communication with third or C phase drive unit 230 to convey an electrical current of a third phase from the drive unit 230 to the third or C phase motor element 130. Output terminal connection 132 is in communication with drive unit 230 to convey an electrical current from the third phase motor element 130 to the drive unit 230.

Referring to FIG. 9, an end view of one or more examples of embodiments of the high acceleration rotary actuator assembly 100 is provided with the end bell 105a removed illustrating the multi-phase tandem rotor servo motor assembly 102 with shaft 104 there through. The electronic drive units 210, 220, 230 are provided a distance offset from and in communication with the multi-phase tandem rotor servo motor assembly 102 through input/output terminal connections 111/112, 121/122, 131/132 (not shown, see FIG. 1). In the embodiment illustrated in FIG. 9, casing 106 is approximately rectangular with the multi-phase tandem rotor servo motor assembly 102 provided alongside and approximately parallel to the electronic drive units 210, 220, 230. It should be appreciated that casing 106 may be any polygonal shape or arrangement suitable for operation and use of the high acceleration rotary actuator assembly 100. Further, in one or more examples of embodiments, the electronic drive units 210, 220, 230 may be provided at an alternative position in relation to the multi-phase tandem rotor servo motor assembly 102, for example, including, but not limited to, above, below, at an angle to, or at any other desired position in relation to the multi-phase tandem rotor servo motor assembly 102.

Figure 10:
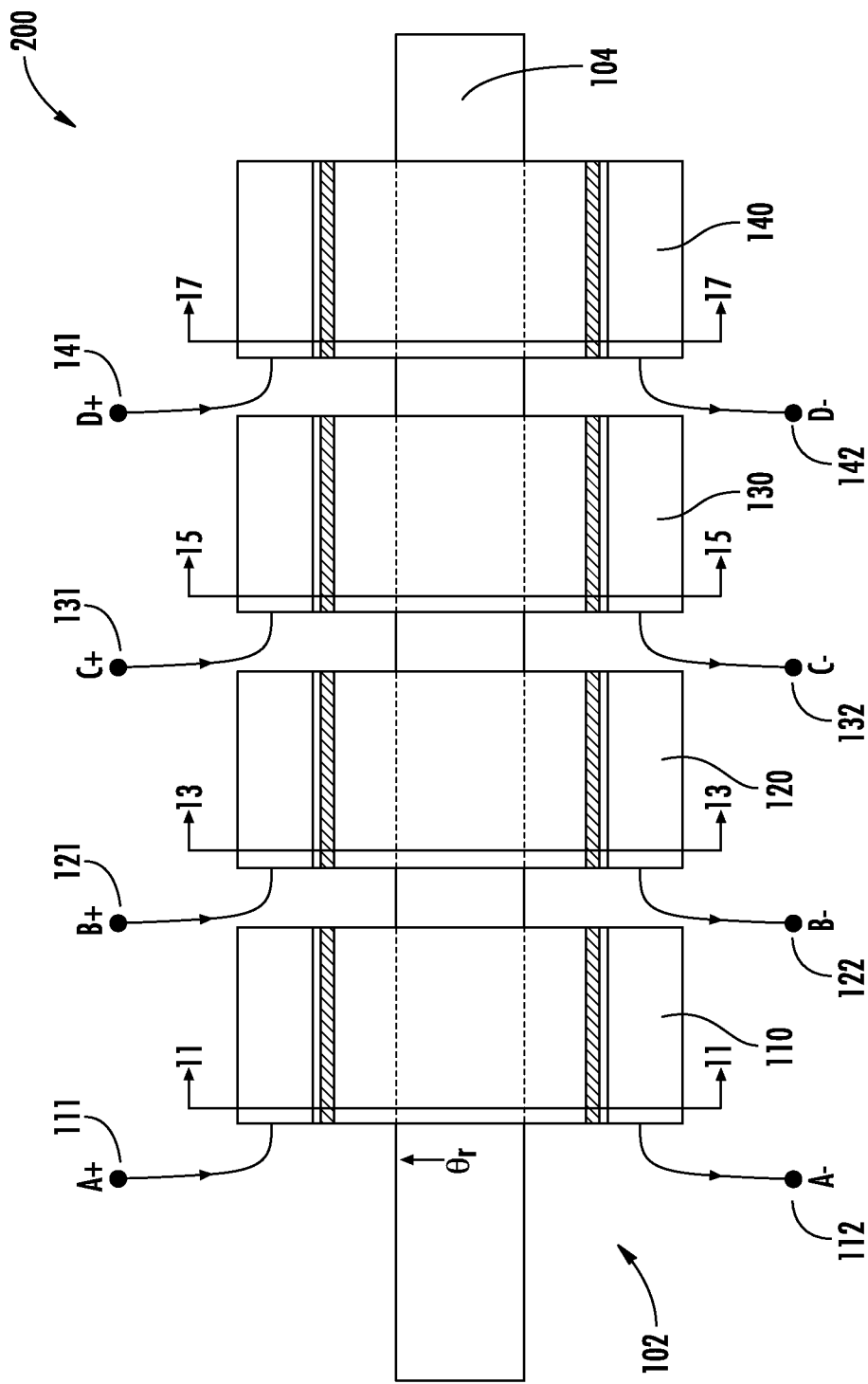
FIG. 10 is a plan view according to one or more examples of embodiments of a high acceleration rotary actuator assembly, showing the rotor and stator assemblies.

An alternative embodiment of the high acceleration rotary actuator assembly 200 is shown in FIGS. 10-18. The high acceleration rotary actuator assembly 200 includes features which are substantially as described herein in association with the high acceleration rotary actuator assembly 100. Operation and particular components described herein are substantially the same and like numbers have been used to illustrate the like components. Referring to FIG. 10, in this embodiment, the multi-phase tandem rotor servo motor assembly 102 includes four phases which are separated into four phase motor elements, a first or A phase motor element 110, a second or B phase motor element 120, a third or C phase motor element 130 and a fourth or D phase motor element 140. Each phase motor element 110, 120, 130, 140 is provided on or about rotating shaft 104. Each phase motor element 110, 120, 130, 140 includes a respective input terminal connection or input lead 111, 121, 131, 141, each of which convey a respective electrical current to the respective phase motor element 110, 120, 130, 140 from a corresponding electronic drive unit 210, 220, 230, 240 (not shown). Each phase motor element 110, 120, 130, 140 additionally includes a respective output terminal connection or output lead 112, 122, 132, 142 which conveys a respective electrical current out of or away from each respective phase motor element 110, 120, 130, 140 to a corresponding electronic drive unit 210, 220, 230, 240 (not shown). The input/output terminal connections 111/112, 121/122, 131/132, 141/142 for each phase motor element 110, 120, 130, 140 are electrically isolated from one another. In other words, the output terminal connections 112, 122, 132, 142 are not tied together to form a neutral point.

Figure 11:
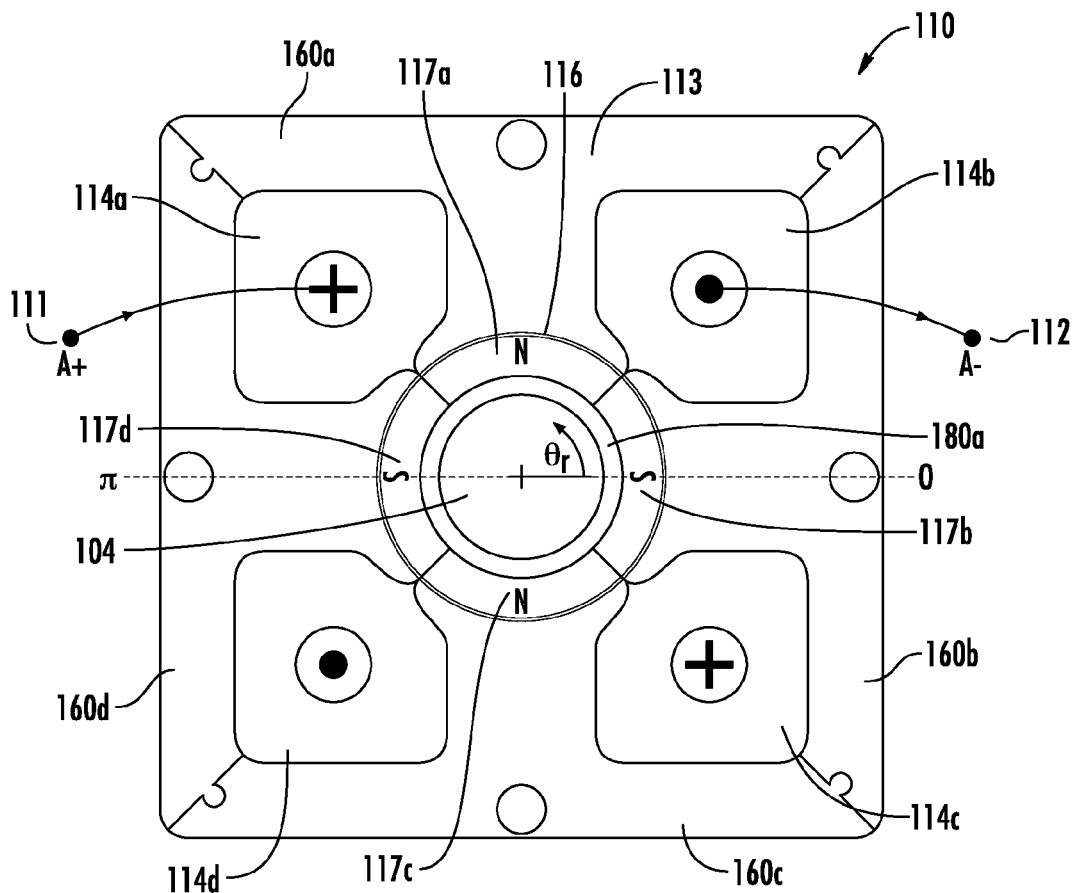
FIG. 11 is a cross-sectional view of a section of the high acceleration rotary actuator assembly of FIG. 10, showing a first phase motor element taken along line 11-11 of FIG. 10.

FIG. 11 illustrates a cross-sectional view of the first phase motor element 110 of the multi-phase tandem rotor servo motor assembly 102 of the high acceleration rotary actuator assembly 200. The first phase motor element 110 includes a plurality of interconnected stator segments 160a, 160b, 160c, 160d, an approximately square stator lamination 113, a plurality of slots 114, slot necks 115, rotor aperture 116, magnets 117, air gap 119, shaft 104 and rotor 180a which are substantially as described herein in association with the first phase motor element 110 illustrated in FIG. 2. Operation and particular components described herein are substantially the same and like numbers have been used to illustrate the like components.

Figure 12:
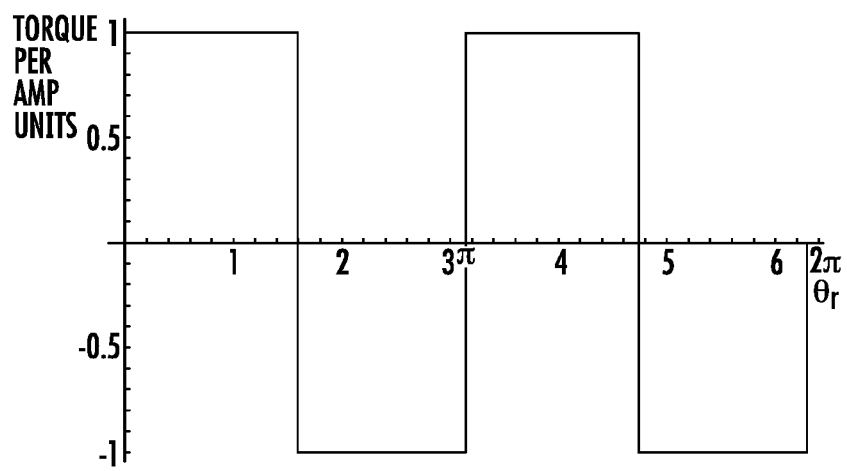
FIG. 12 is a graph showing the torque per amp versus rotor angle for one revolution of the rotor provided in the first phase motor element of FIG. 11.

FIG. 12 illustrates a graphical representation of the angle of rotation of the rotor, $\theta_r$ (X-axis) versus the torque per amp (Y-axis) for one revolution of rotor 180a about the rotor aperture 116 of the first phase motor element 110. The torque per amp versus rotor angle of the first phase motor element 110 is in the shape of a square or approximate square wave. The square wave is generated by the continuous or uniform thickness of magnets 117 about rotor 180a in air gap 119 of the rotor aperture 116. Based upon the four magnetic poles (or two pole pairs) of the first phase motor element 110, the torque per amp versus rotor angle completes two electrical cycles for every one revolution or 360° (three-hundred and sixty degrees) of rotation of rotor 180a. The first electrical cycle is completed at 180° (one-hundred and eighty degrees) or $\pi$ (pie) radians of rotation of rotor 180a, while the second electrical cycle is completed at 360° (three-hundred and sixty degrees) or $2\pi$ (two pie) radians of rotation of rotor 180a.

Figure 13:
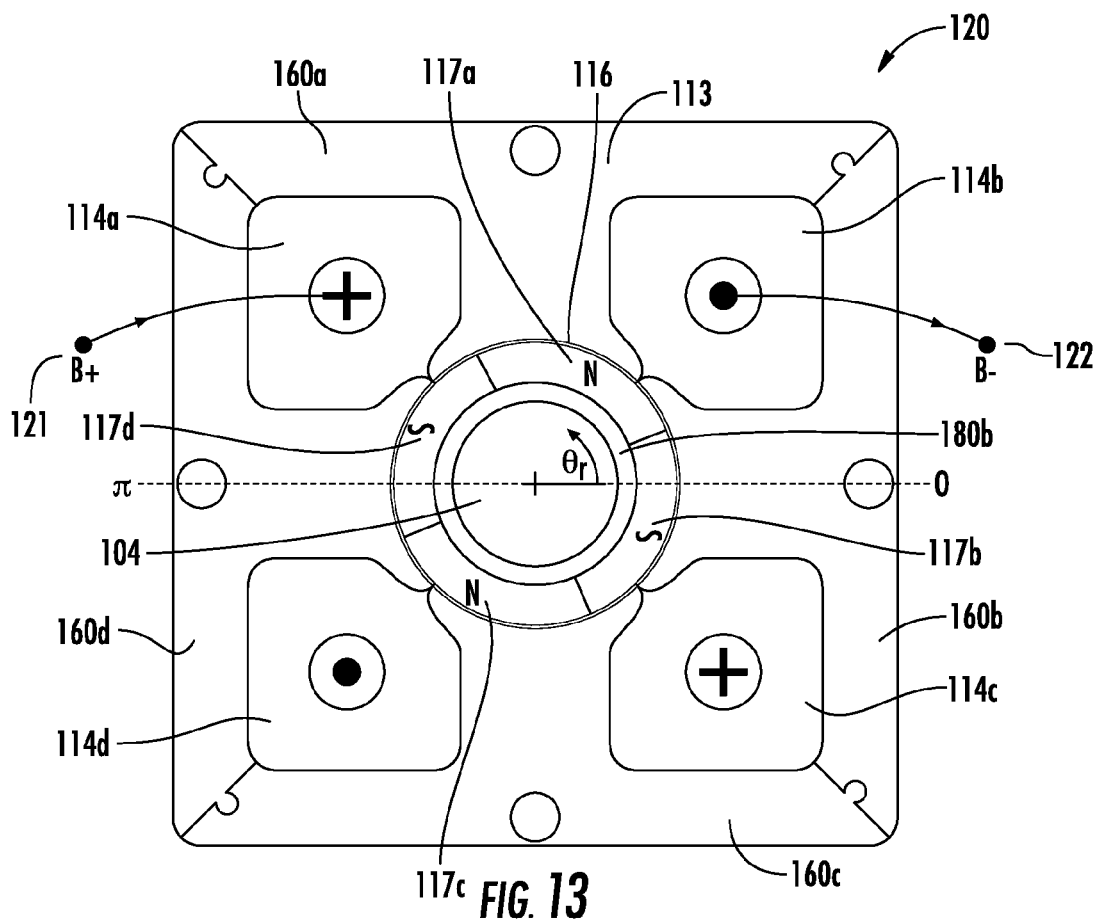
FIG. 13 is a cross-sectional view of a section of the high acceleration rotary actuator assembly of FIG. 10, showing a second phase motor element taken along line 13-13 of FIG. 10.

FIG. 13 illustrates a cross-sectional view of the second phase motor element 120 of the multi-phase tandem rotor servo motor assembly 102 of the high acceleration rotary actuator assembly 200. The second phase motor element 120 includes a plurality of interconnected stator segments 160a, 160b, 160c, 160d, an approximately square stator lamination 113, a plurality of slots 114, slot necks 115, rotor aperture 116, magnets 117 and air gap 119 which are substantially as described herein in association with the first phase motor element 110 of FIG. 2. Operation and particular components described herein are substantially the same and like numbers have been used to illustrate the like components. Within the rotor aperture 116 of the second phase motor element 120, common shaft 104 carries rotor 180b. Mounted upon or connected to rotor 180b is a plurality of magnets 117. As illustrated in FIG. 13, rotor 180b carries four magnets 117a, 117b, 117c, 117d. Rotor 180b and the attached magnets 117a, 117b, 117c, 117d are substantially the same as those described in association with rotor 180a, but for the positioning of rotor 180b in relation to rotor 180a on shaft 104. Rotor 180b is provided on shaft 104 approximately 22.5° (twenty-two point five degrees) mechanically lagging from rotor 180a. In other words, comparing the cross-sectional view of the first phase motor element 110 of FIG. 11 to the cross-sectional view of the second phase motor element 120 of FIG. 13, rotor 180b (and the associated magnets 117) is illustrated as offset or rotated from rotor 180a (and the associated magnets 117) by approximately 22.5° (twenty-two point five degrees) lagging. Put differently, according to the illustrated view of FIG. 13, rotor 180b (and the associated magnets 117) is disposed about shaft 104 approximately 22.5° (twenty-two point five degrees) in the clockwise direction as compared to rotor 180a

(of FIG. 11), as FIGS. 11 and 13 illustrate the rotation of shaft 104 as in the counter-clockwise direction. In addition to rotor 180b mechanically lagging rotor 180a by approximately 22.5° (twenty-two point five degrees), rotor 180b has an electrical angle which is lagging rotor 180a by approximately 45° (forty five degrees). The associated electrical angle of rotor 180b can be calculated by multiplying the mechanical angle by N, where N equals the number of pole pairs (or one-half the total number of poles).

Figure 14:
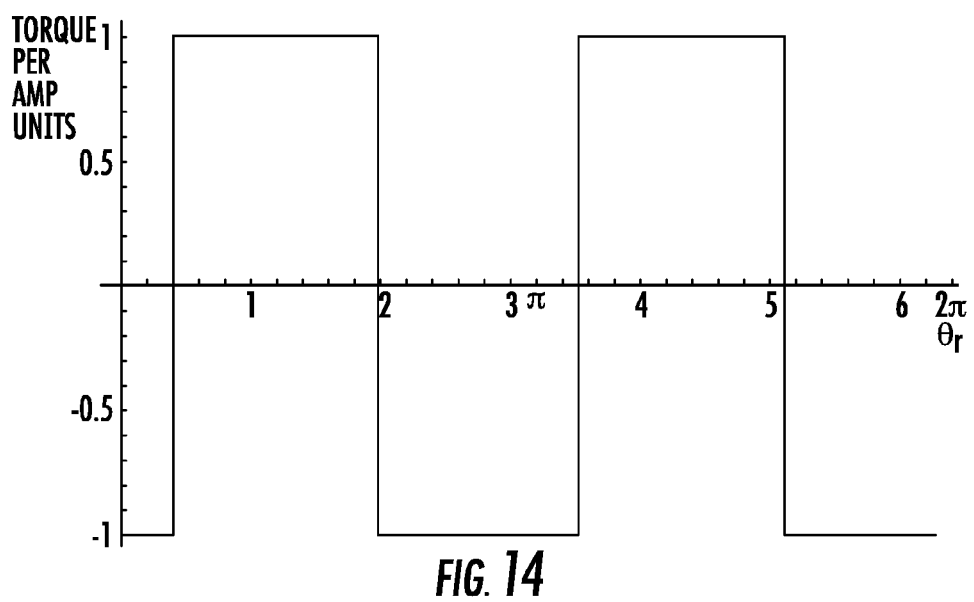
FIG. 14 is a graph showing the torque per amp versus rotor angle for one revolution of the rotor provided in the second phase motor element of FIG. 13.

FIG. 14 illustrates a graphical representation of the angle of rotation of the rotor, $\theta_r$ (X-axis) versus the torque per amp (Y-axis) for one revolution of rotor 180b about the rotor aperture 116 of the second phase motor element 120 of FIG. 13. The torque per amp versus rotor angle of the second phase motor element 120 is in the shape of a square or approximate square wave. The square wave is generated by the continuous or uniform thickness of magnets 117 about rotor 180b in air gap 119 of the rotor aperture 116. Based upon the four magnetic poles (or two pole pairs) of the second phase motor element 120, the torque per amp versus rotor angle completes two electrical cycles for every one revolution or 360° (three-hundred and sixty degrees) of rotation of rotor 180b. The first electrical cycle is completed at 180° (one-hundred and eighty degrees) or π (pie) radians of rotation of rotor 180b, while the second electrical cycle is completed at 360° (three-hundred and sixty degrees) or 2π (two pie) radians of rotation of rotor 180b. Comparing torque per amp versus rotor angle of FIG. 14 to FIG. 12, the torque per amp of FIG. 14 is shifted 22.5° (twenty-two point five degrees) mechanically lagging to the torque per amp of FIG. 12. In other words, the torque per amp curve of FIG. 14 is shifted π/8 radians to the right as compared to the torque per amp curve of FIG. 12. This is due to rotor 180b being rotated about shaft 104 22.5° (twenty-two point five degrees) behind, or lagging, rotor 180a.

Figure 15:
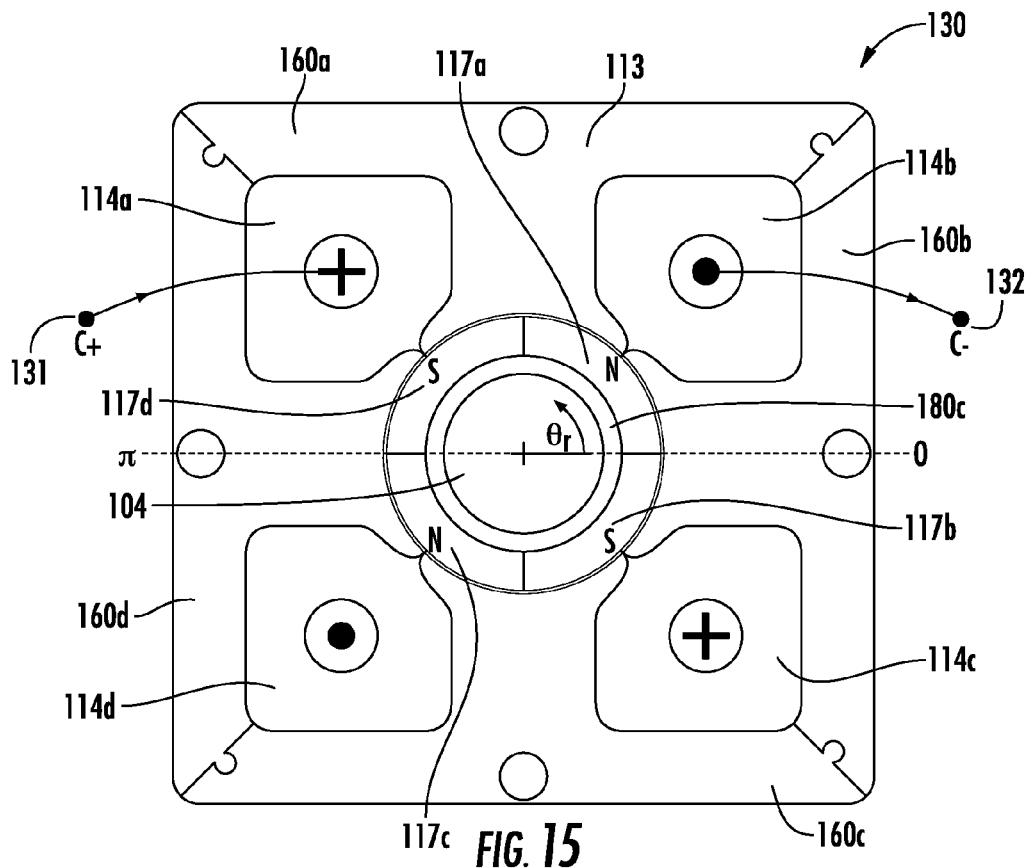
FIG. 15 is a cross-sectional view of a section of the high acceleration rotary actuator assembly of FIG. 10, showing a third phase motor element taken along line 15-15 of FIG. 10.

FIG. 15 illustrates a cross-sectional view of the third phase motor element 130 of the multi-phase tandem rotor servo motor assembly 102 of the high acceleration rotary actuator assembly 200. The third phase motor element 130 includes a plurality of interconnected stator segments 160a, 160b, 160c, 160d, an approximately square stator lamination 113, a plurality of slots 114, slot necks 115, rotor aperture 116, magnets 117 and air gap 119 which are substantially as described herein in association with the first phase motor element 110 of FIG. 2. Operation and particular components described herein are substantially the same and like numbers have been used to illustrate the like components. Within the rotor aperture 116 of the third phase motor element 130, common shaft 104 carries rotor 180cd. Mounted upon or connected to rotor 180c is a plurality of magnets 117. As illustrated in FIG. 15, rotor 180c carries four magnets 117a, 117b, 117c, 117d. Rotor 180c and the attached magnets 117a, 117b, 117c, 117d are substantially the same as those described in association with rotor 180a, but for the positioning of rotor 180c in relation to rotor 180a on shaft 104. Rotor 180c is provided on shaft 104 approximately 45° (forty five degrees) mechanically lagging from rotor 180a. In other words, comparing the cross-sectional view of the first phase motor element 110 of FIG. 11 to the cross-sectional view of the third phase motor element 130 of FIG. 15, rotor 180c (and the associated magnets 117) is illustrated as offset or rotated from rotor 180a (and the associated magnets 117) by approximately 45° (forty five degrees) lagging. Put differently, according to the illustrated view of FIG. 15, rotor 180c (and the associated magnets 117) is disposed about shaft 104 approximately 45° (forty five degrees) in the clockwise direction as compared to rotor 180a (of FIG. 11), as FIGS. 11 and 15 illustrate the rotation of shaft 104 as in the counter-clockwise direction. In addition to rotor 180c mechanically lagging rotor 180a by approximately 45° (forty five degrees), rotor 180c has an electrical angle which is lagging rotor 180a by approximately 90° (ninety degrees). The associated electrical angle of rotor 180c can be calculated by multiplying the mechanical angle by N, where N equals the number of pole pairs (or one-half the total number of poles).

Figure 16:
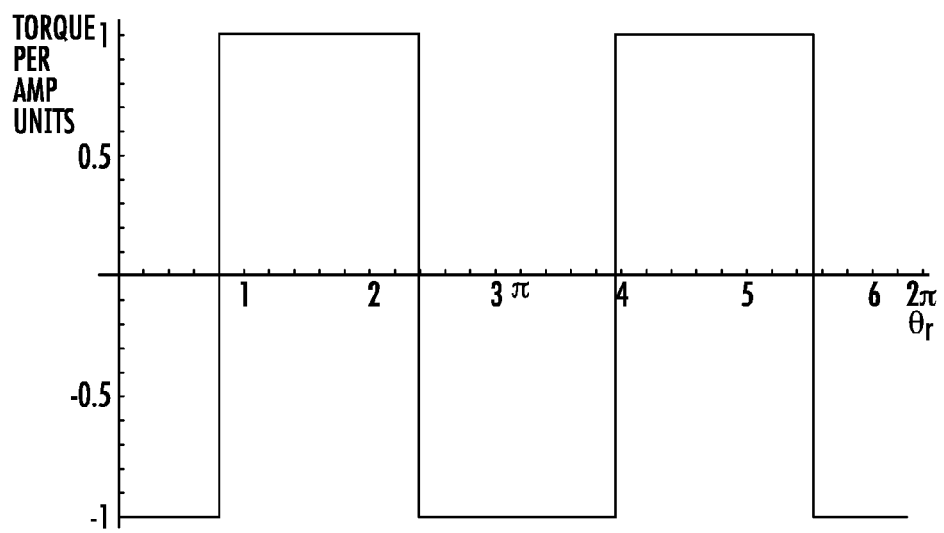
FIG. 16 is a graph showing the torque per amp versus rotor angle for one revolution of the rotor provided in the third phase motor element of FIG. 15.

FIG. 16 illustrates a graphical representation of the angle of rotation of the rotor, $\theta_r$ (X-axis) versus the torque per amp (Y-axis) for one revolution of rotor 180c about the rotor aperture 116 of the third phase motor element 130 of FIG. 15. The torque per amp versus rotor angle of the third phase motor element 130 is in the shape of a square or approximate square wave. The square wave is generated by the continuous or uniform thickness of magnets 117 about rotor 180c in air gap 119 of the rotor aperture 116. Based upon the four magnetic poles (or two pole pairs) of the third phase motor element 130, the torque per amp versus rotor angle completes two electrical cycles for every one revolution or 360° (three-hundred and sixty degrees) of rotation of rotor 180cd. The first electrical cycle is completed at 180° (one-hundred and eighty degrees) or π (pie) radians of rotation of rotor 180c, while the second electrical cycle is completed at 360° (three-hundred and sixty degrees) or 2π (two pie) radians of rotation of rotor 180cd. Comparing torque per amp versus rotor angle of FIG. 16 to FIG. 12, the torque per amp of FIG. 16 is shifted 45° (forty five degrees) mechanically lagging to the torque per amp of FIG. 12. In other words, the torque per amp curve of FIG. 16 is shifted π/4 radians to the right as compared to the torque per amp curve of FIG. 12. This is due to rotor 180c being rotated about shaft 104 45° (forty five degrees) behind, or lagging, rotor 180a.

Figure 17:
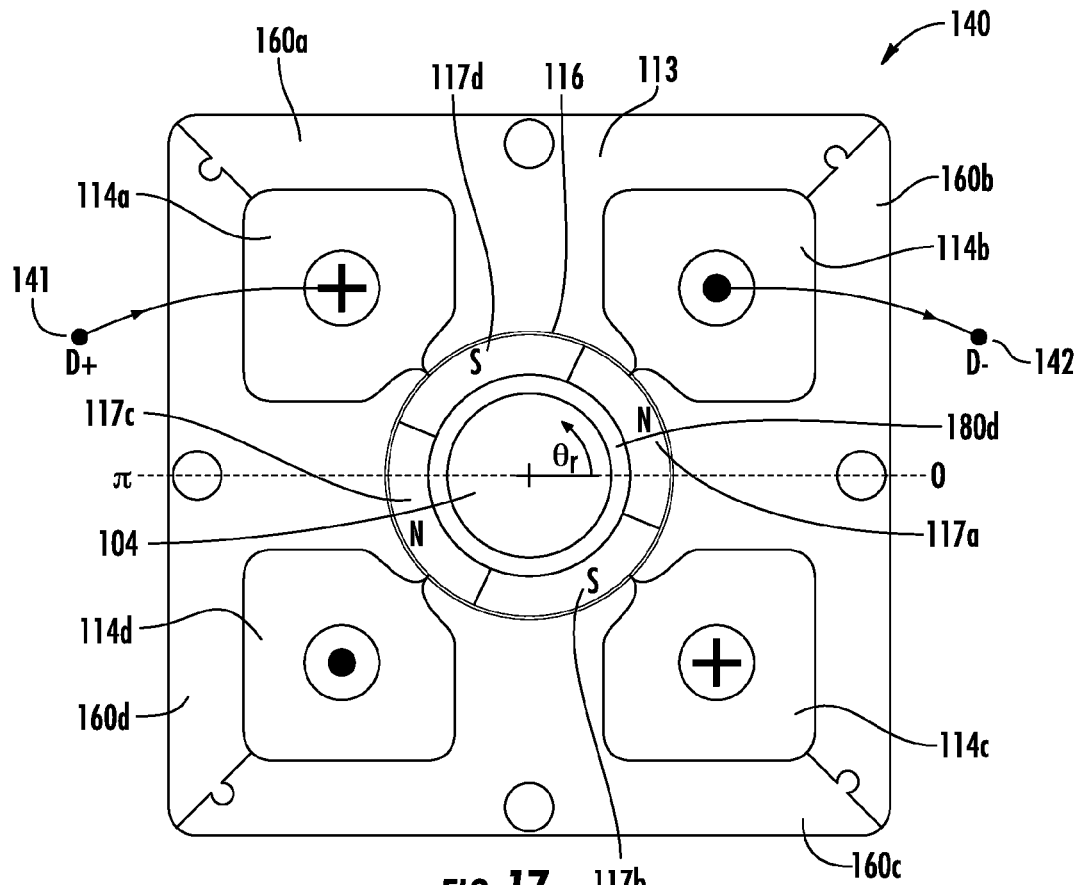
FIG. 17 is a cross-sectional view of a section of the high acceleration rotary actuator assembly of FIG. 10, showing a fourth phase motor element taken along line 17-17 of FIG. 10.

FIG. 17 illustrates a cross-sectional view of the fourth phase motor element 140 of the multi-phase tandem rotor servo motor assembly 102 of the high acceleration rotary actuator assembly 200. The fourth phase motor element 140 includes a plurality of interconnected stator segments 160a, 160b, 160c, 160d, an approximately square stator lamination 113, a plurality of slots 114, slot necks 115, rotor aperture 116, magnets 117 and air gap 119 which are substantially as described herein in association with the first phase motor element 110 of FIG. 2. Operation and particular components described herein are substantially the same and like numbers have been used to illustrate the like components. Slot 114a of the fourth phase motor element 140 receives the fourth input terminal connection 141, while the second output terminal connection 142 exits from slot 114b. Within the rotor aperture 116 of the fourth phase motor element 140, common shaft 104 carries rotor 180d. Mounted upon or connected to rotor 180d is a plurality of magnets 117. As illustrated in FIG. 4, rotor 180d carries four magnets 117a, 117b, 117c, 117d. Rotor 180d and the attached magnets 117a, 117b, 117c, 117d are substantially the same as those described in association with rotor 180a, but for the positioning of rotor 180d in relation to rotor 180a on shaft 104. Rotor 180d is provided on shaft 104 approximately 67.5° (sixty seven point five degrees) mechanically lagging from rotor 180a. In other words, comparing the cross-sectional view of the first phase motor element 110 of FI. 11 to the cross-sectional view of the fourth phase motor element 140 of FIG. 17, rotor 180d (and the associated magnets 117) is illustrated as offset or rotated from rotor 180a (and the associated magnets 117) by approximately 67.5° (sixty seven point five degrees) lagging. Put differently, according to the illustrated view of FIG. 17, rotor 180d (and the associated magnets 117) is disposed about shaft 104 approximately 67.5° (sixty seven point five degrees) in the clockwise direction as compared to rotor 180a (of FIG.

11), as FIGS. 11 and 17 illustrate the rotation of shaft 104 as in the counter-clockwise direction. In addition to rotor 180d mechanically lagging rotor 180a by approximately 67.5° (sixty seven point five degrees), rotor 180d has an electrical angle which is lagging rotor 180a by approximately 135° (one hundred and thirty five degrees). The associated electrical angle of rotor 180d can be calculated by multiplying the mechanical angle by N, where N equals the number of pole pairs (or one-half the total number of poles).

Figure 18:
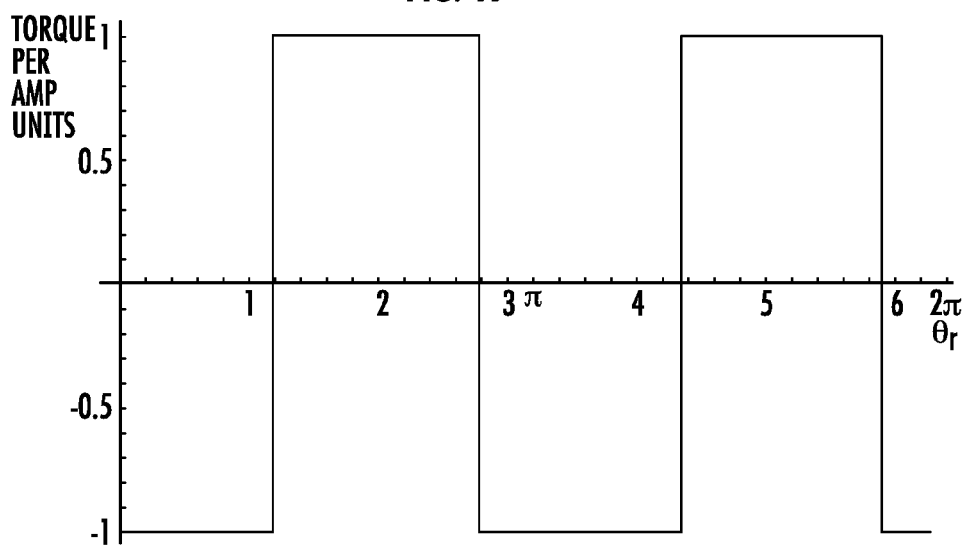
FIG. 18 is a graph showing the torque per amp versus rotor angle for one revolution of the rotor provided in the fourth phase motor element of FIG. 17.

FIG. 18 illustrates a graphical representation of the angle of rotation of the rtor, $\theta_r$ (X-axis) versus the torque per amp (Y-axis) for one revolution of rotor 180d about the rotor aperture 116 of the fourth phase motor element 140 of FIG. 17. The torque per amp versus rotor angle of the fourth phase motor element 140 is in the shape of a square or approximate square wave. The square wave is generated by the continuous or uniform thickness of magnets 117 about rotor 180d in air gap 119 of the rotor aperture 116. Based upon the four magnetic poles (or two pole pairs) of the fourth phase motor element 140, the torque per amp versus rotor angle completes two electrical cycles for every one revolution or 360° (three-hundred and sixty degrees) of rotation of rotor 180d. The first electrical cycle is completed at 180° (one-hundred and eighty degrees) or π (pie) radians of rotation of rotor 180d, while the second electrical cycle is completed at 360° (three-hundred and sixty degrees) or 2π (two pie) radians of rotation of rotor 180d. Comparing torque per amp versus rotor angle of FIG. 18 to FIG. 12, the torque per amp of FIG. 18 is shifted 67.5° (sixty seven point five degrees) mechanically lagging to the torque per amp of FIG. 12. In other words, the torque per amp curve of FIG. 18 is shifted 3π/8 radians to the right as compared to the torque per amp curve of FIG. 12. This is due to rotor 180d being rotated about shaft 104 67.5° (sixty seven point five degrees) behind, or lagging, rotor 180a.

It should be appreciated in one or more examples of embodiments that the high acceleration rotary actuator assembly 100 may include a few as two phase motor elements or five or more phase motor elements provided in tandem on a shaft 104. In one or more examples of embodiments of the high acceleration rotary actuator assembly 100 having two phase motor elements, each phase motor element may be substantially as described herein in association with the first phase motor element 110 of FIG. 2, but for the positioning of the respective rotors 180 on shaft 104. For example, the rotors 180 on shaft 104 are offset from one another by approximately 45° (forty five degrees), wherein one rotor is mechanically lagging the other rotor. Further, the mechanically lagging rotor has an electrical angle which is lagging the other rotor by approximately 90° (ninety degrees), wherein the electrical angle is calculated by multiplying the mechanical angle by N, where N equals the number of pole pairs (or one-half the total number of poles). In addition, in one or more examples of embodiments of the high acceleration rotary actuator assembly 100 having five phase motor elements, each phase motor element may be substantially as described herein in association with the first phase motor element 110 of FIG. 2, but for the positioning of the respective rotors 180 on shaft 104. The rotors 180 of each successive phase motor element on shaft 104 are offset from the next successive phase motor element rotor by approximately 15° (fifteen degrees), wherein each successive phase motor element rotor is mechanically lagging the previous phase motor element rotor. Further, each mechanically lagging rotor has an electrical angle which is lagging the previous phase motor element rotor by approximately 30° (thirty degrees). To this end, in one or more examples of embodiments, the high acceleration rotary actuator assembly 100 may include X number of phases or phase motor elements provided in tandem on a shaft 104, wherein the offset or mechanical lagging of the rotors between each phase motor element is calculated by 90°/X (ninety degrees divided by the number of phases or phase motor elements).

Figure 19:
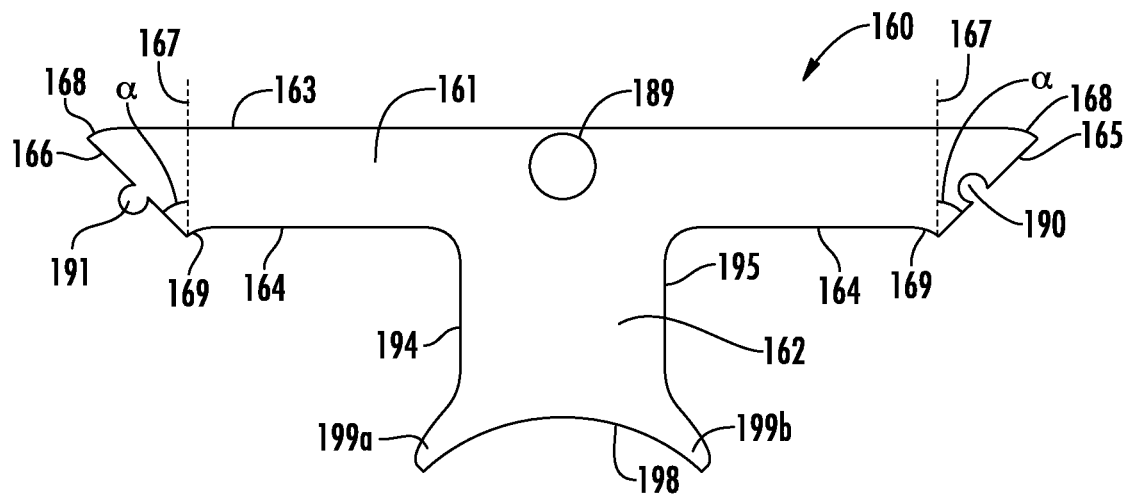
FIG. 19 is an elevation view of one or more examples of embodiments of a stator element segment used in association with the stator phase elements of the high acceleration rotary actuator assembly of FIGS. 1 and 10.

FIG. 19 illustrates one or more examples of embodiments of a stator element segment 160. The stator element segment 160 may include a longitudinal member 161. The longitudinal member 161 may include a first side 163 opposing a second side 164. In various embodiments, the first side 163 and second side 164 may be provided substantially parallel to one another. The first and second sides 163, 164 of the longitudinal member 161 may be spaced apart by a first end 165 and a second end 166. The first and second ends 165, 166 of the longitudinal member 161 may be opposing ends. In various embodiments, the first and second ends 165, 166 may be provided at an angle α (alpha) formed between the respective first and second ends 165, 166 and an imaginary line 167 extending between and approximately perpendicular to the first and second sides 163, 164 of the longitudinal member 161. For example, as illustrated in FIG. 19, the first and second ends 165, 166 may be provided at an angle α (alpha) which is approximately a 45° (forty five degree) angle between the first and second ends 165, 166 and the imaginary line 167 extending between and approximately perpendicular to the first and second sides 163, 164 of the longitudinal member 161. The first and second ends 165, 166 may intersect the first side 163 at a first lip 168. As shown in FIG. 19, the first lip 168 may be provided at an angle to the first side 163, such that the first lip 168 is rounded or has an angle of curvature or extends away from the first side 163 toward the second side 164. Further, the first and second ends 165, 166 may intersect the second side 164 at a second lip 169. As shown in FIG. 19, the second lip 169 may be provided at an angle to the second side 164, such that the second lip 169 is rounded or has an angle of curvature or extends away from the second side 164 in a direction away the first side 163. The first end 165 may define a receiving aperture or recess 190, while the second end 166 may include an attachment post 191. The receiving aperture 190 of the first end 165 is adapted to receive an attachment post 191 of a second end 166. For example, the receiving aperture 190 of the first end 165 illustrated in FIG. 19 may receive a corresponding attachment post 191 on the second end 166 of another, separate stator element segment 160. Similarly, the attachment post 191 of the second end 166 illustrated in FIG. 19 may engage or be received by a corresponding receiving aperture 190 on a first end 165 of another, separate stator element segment 160. In this way, separate stator element segments 160 may engage one another or interconnect to form an approximately square segmented stator lamination stack 113, as described in association with phase motor elements 110, 120, 130, 140. The longitudinal member 161 may define or include an alignment hole or bolt hole 189. The alignment hole 189 may be used to align a plurality of stacked stator element segments 160. In addition, the alignment hole 189 may receive a bolt (not shown) to connect a plurality of stacked stator element segments 160 to one another or to a respective phase motor element 110, 120, 130, 140.

The stator element segment 160 may also include a perpendicular member 162. As illustrated in FIG. 19, the perpendicular member 162 is provided approximately perpendicular to longitudinal member 161. The perpendicular member 162 may intersect the longitudinal member 161 at approximately the mid-point of the longitudinal member 161. In one or more examples of embodiments, the longitudinal member 161 and perpendicular member 162 are integrally formed or unitary.

Further, in one or more examples of embodiments and as illustrated in FIG. 19, the longitudinal member 161 and perpendicular member 162 may form an approximate T-shape or are provided in the shape of the letter "T."

The perpendicular member 162 may include a first border 194 and a second border 195. The first and second borders 194, 195 may be provided approximately parallel to one another. Further, the first and second borders 194, 195 may be approximately perpendicular to the longitudinal member 161, first side 163 and second side 164. As shown in FIG. 19, the distance between the first and second borders 194, 195 may be less than half of the distance between the first and second ends 165, 166, or length, of longitudinal member 161. The perpendicular member 162 may also include an arcuate end 198 opposite the longitudinal member 161. The arcuate end 198 may include a first tooth 199a and a second tooth 199b. The first tooth 199a intersects the arcuate end 198 and the first border 194, while the second tooth 199b intersects the arcuate end 198 and the second border 195. It should be appreciated that when a plurality of stator element segments 160 interconnect to form the approximately square segmented stator lamination stack 113 as described in association with phase motor elements 110, 120, 130, 140, the arcuate ends 198 define the rotor aperture 116, while the second side 164 of the longitudinal member 161 and the first and second borders 194, 195 of the perpendicular member 162 define slots 114.

Figure 20:
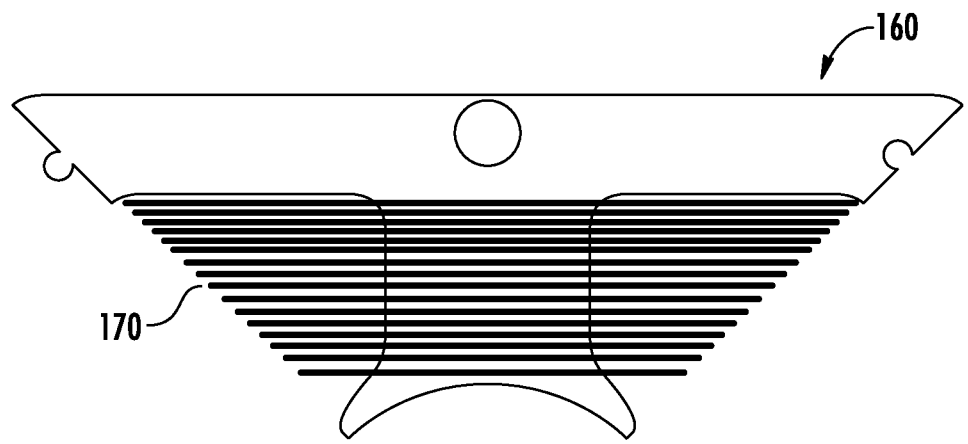
FIG. 20 is an elevation view of the stator element segment of FIG. 19, showing winding provided on the stator element segment.

FIG. 20 illustrates a stator element segment 160 having winding 170 provided thereon. The winding 170 is a single, continuous wire which is wound around the perpendicular member 162 of the stator element segment 160. Once a stator element segment 160 has received the desired amount of winding 170, the single, continuous wire is wound around another stator element segment 160. Accordingly, a plurality of stator element segments 160 are interconnected by winding 170, as the winding 170 is the same, contiguous wire. To this end, a plurality of stator element segments 160 may be wound with winding 170 formed of the same, contiguous wire. The plurality of wound stator element segments 160 may subsequently be interconnected to form the approximately square segmented stator lamination stack 113 as described in association with phase motor elements 110, 120, 130, 140. By winding a complete phase made of segmented stator elements 160 with a winding 170 of a single, contiguous wire as described herein provides advantages. By using a single, contiguous wire, potentially unreliable solder joints are excluded from the winding 170. Further, segmented stator elements 160 provides for improved slot fill, as an increased amount of conductor volume or wire may be placed in the slot, reducing the heat generated in the winding 170 for a given torque and resulting in a higher torque value and an increase in torque to inertia ratio. In addition, an increase in slot fill reduces end turn waste.

Figure 21:
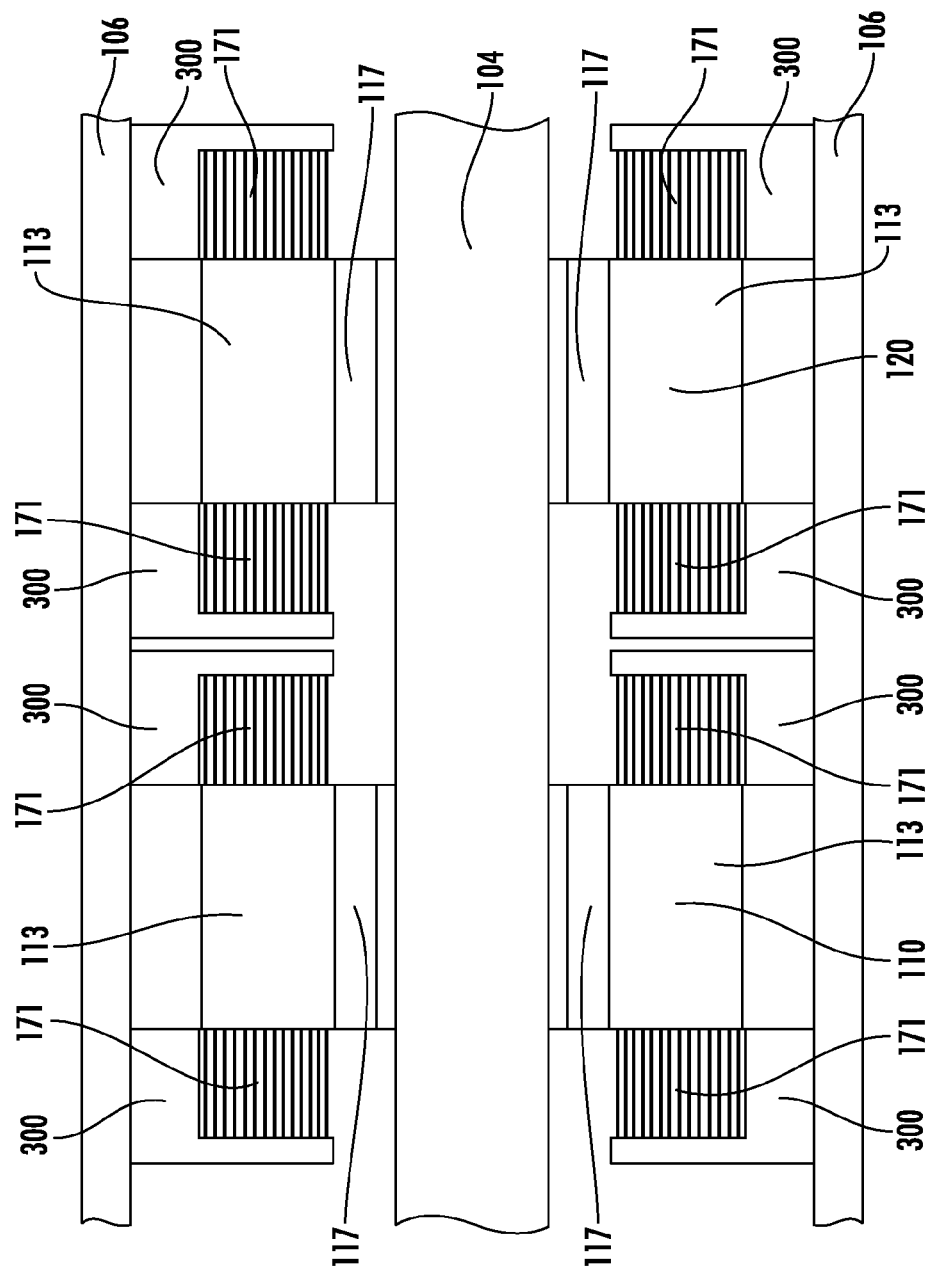
FIG. 21 is an elevation view of a portion of one or more examples of embodiments of the high acceleration rotary actuator assembly of FIG. 1, showing heat conducting elements adapted to extract heat from the stator lamination and winding end turns.

FIG. 21 illustrates a portion of the high acceleration rotary actuator assembly 100, including the first phase and second phase motor elements 110, 120. The phase motor elements 110, 120 include the elements substantially as described herein in association with the first phase motor element 110 illustrated in FIG. 2 and second phase motor element 120 illustrated in FIG. 4, including a plurality of interconnected stator segments 160a, 160b, 160c, 160d, an approximately square stator lamination 113, a plurality of slots 114, slot necks 115, rotor aperture 116, magnets 117, air gap 119, shaft 104 and rotor 180. Operation and particular components described herein are substantially the same and like numbers have been used to illustrate the like components. Referring to FIG. 21, the motor elements 110, 120 are surrounded by heat shrunk tube or casing 106. Stator laminations 113 have winding which includes winding end turns 171. Heat conducting elements 300 are provided in communication with the stator laminations 113 and winding end turns 171 to conduct or remove heat away from the respective stator laminations 113 and winding end turns 171. The heat conducting elements 300 may be formed of a thermally conductive insulation compound, for example, but not limited to, aluminum, carbon graphite, a carbon graphite laminate, copper, ceramic, or any other known or future developed material suitable to conduct heat away from the stator laminations 113 and/or winding end turns 171.

Figure 22:
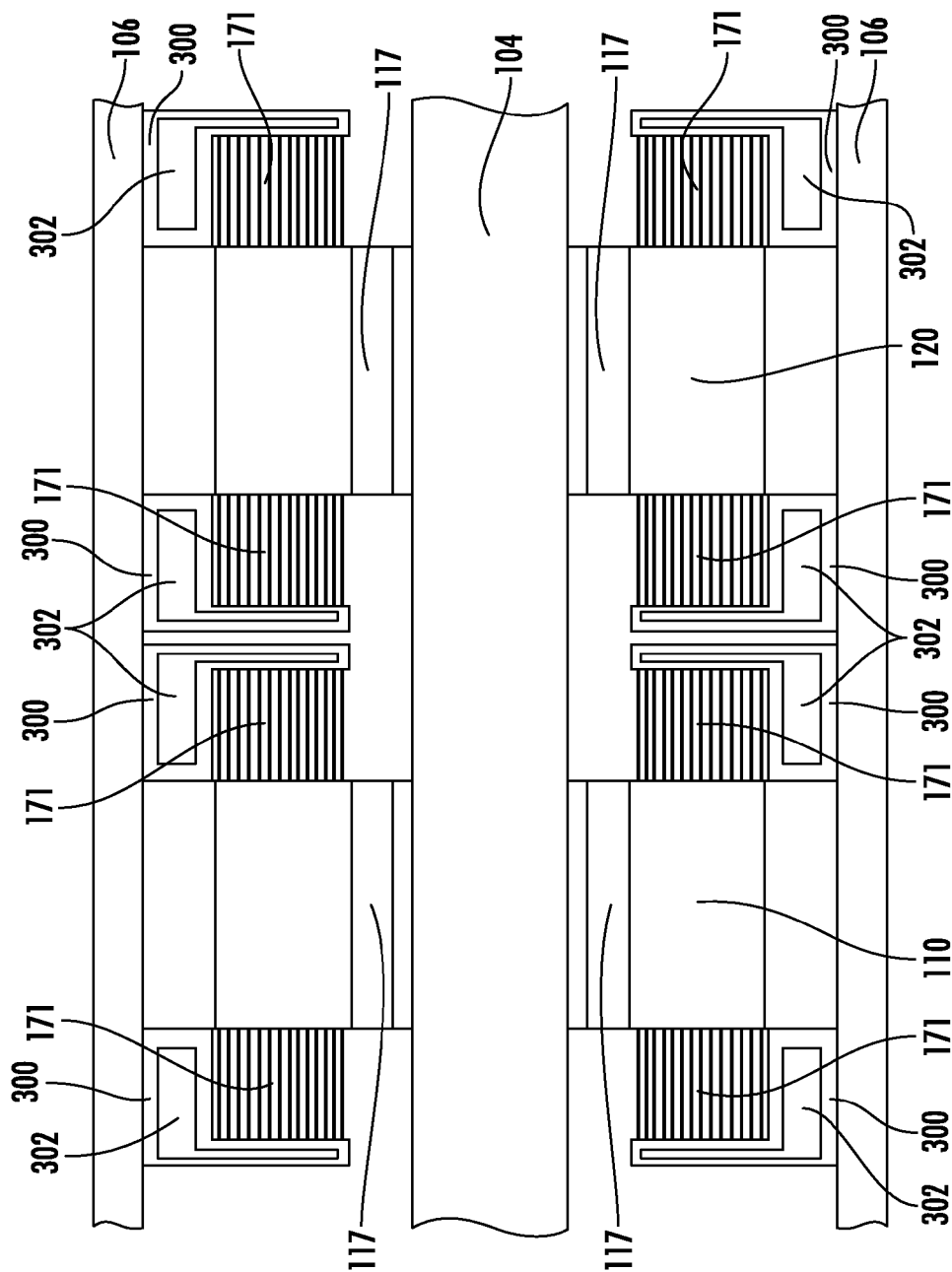
FIG. 22 is an elevation view of a portion of one or more examples of embodiments of the high acceleration rotary actuator assembly of FIG. 1, showing heat conducting elements having a liquid cooling chamber adapted to extract heat from the stator lamination and winding end turns.

FIG. 22 illustrates a portion of the high acceleration rotary actuator assembly 100, which is substantially as described herein in association with FIG. 21. Operation and particular components described herein are substantially the same and like numbers have been used to illustrate the like components. The heat conducting elements 300 may include a chamber 302 adapted to receive a liquid cooling material. The heat conducting elements 300 having a liquid cooling chamber 302 provide for additional heat extraction from the respective stator laminations 113 and winding end turns 171 than heat conducting elements 300 alone or motors not having heat conducting elements 300.

Figure 23:
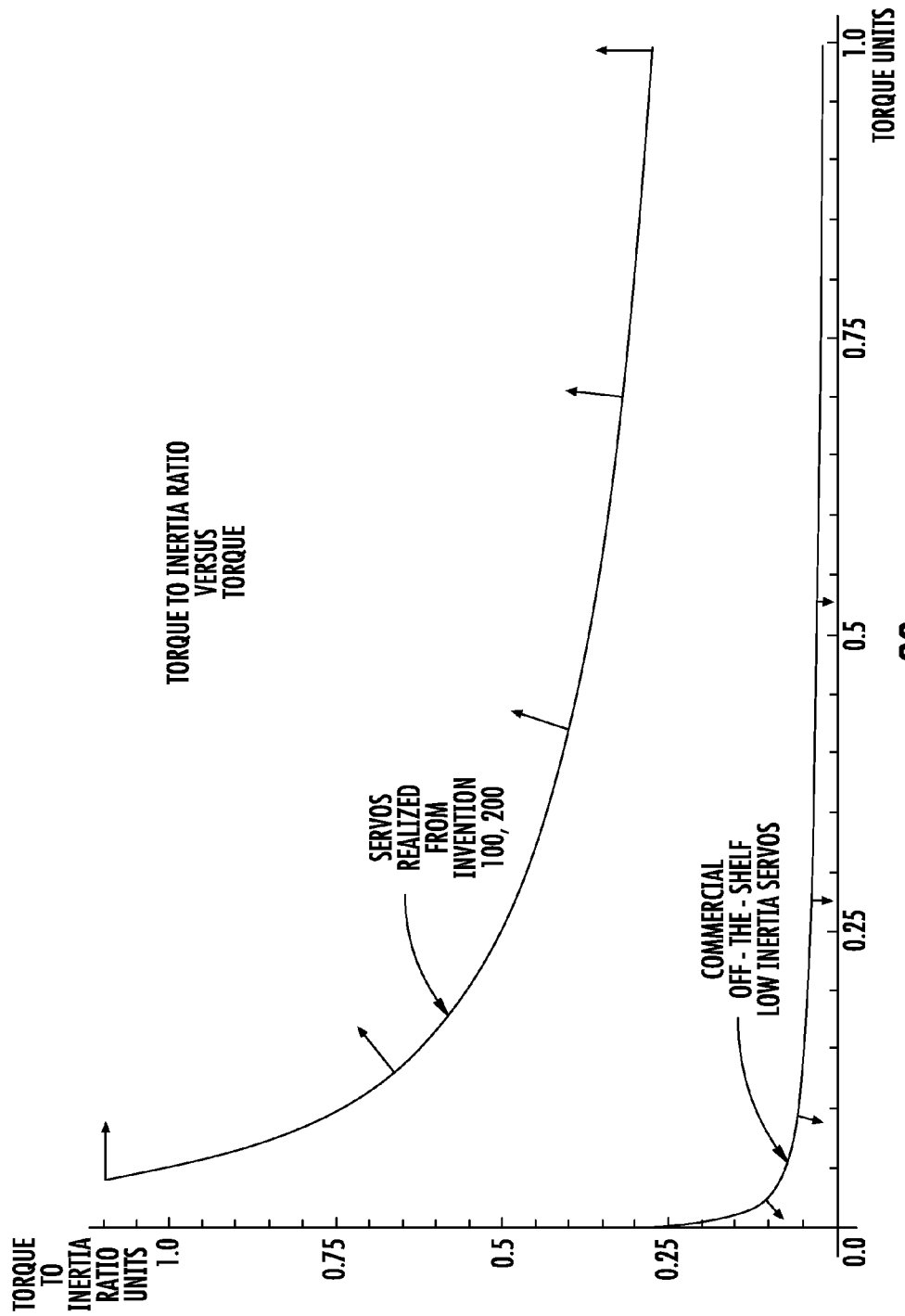
FIG. 23 is a graph showing the motor torque rating (X-axis) versus the torque to inertia ratio (Y-axis) comparing commercially available low inertia servo motors with the high acceleration rotary actuator assembly.

FIG. 23 illustrates a graphical representation of the motor torque rating (X-axis) versus the torque to inertia ratio (Y-axis) comparing servo motors currently commercially available with the high acceleration rotary actuator assembly 100, 200 in accordance with the assembly and associated advantages disclosed herein. The graph illustrates the increase in torque to inertia ratio at a motor torque rating of the high acceleration rotary actuator assembly 100, 200 as compared with servo motors currently commercially available.

There are several advantages to the high acceleration rotary actuator assembly. The high acceleration rotary actuator assembly has a low inertia rotor and shaft. The shaft has a lower inertia than shafts or rotors of comparable motors, as the shaft has a longer length and smaller diameter due to the tandem arrangement of the phase motor elements. This provides for less inertia at a given torque than traditional motors.

In addition, the approximate square shaped configuration of the stator lamination provides advantages over standard circular stator lamination. An approximate square shaped configuration provides a greater amount of back iron in the stator lamination than a standard circular stator lamination, allowing for an increased amount of conductive material or winding to be wound about each stator segment. Further, the square shaped configuration of the stator lamination allows for a larger slot area, providing for an increased amount of conductive material or winding to be wound about each stator segment and placed in or through slots, increasing the slot fill over a standard circular stator lamination. The increased slot fill also advantageously reduces the heat generation for a given torque and allows for a higher torque and torque to inertia ratio. Further, slots may be provided toward the corners of the stator lamination, providing for a reduction in heat build-up in the stator lamination due to the improved heat transfer or heat dissipation or cooling.

In addition, the segmented stator formed of segmented stator elements provide for a winding with a single, contiguous wire. This eliminates potential damage to the motor, for example by electrical short, by excluding unreliable solder joints which are traditionally used to connect windings. Further, the segmented stator elements provide for an improved slot fill, as an increased amount of winding may be placed in the slot, reducing the heat generated in the winding for a given torque and resulting in a higher torque value and an increase in torque to inertia ratio. Further, by increasing slot fill, end turn waste is reduced.

In addition, electrically isolating each of the phase motor elements provides for a high torque to inertia ratio. Motors which tie the phase terminals together to a neutral point incur a restriction in the realization of the optimum current waveform and defeat the electrical isolation of the phases. Electrically isolating each phase motor element may assist in the realization of the optimum current waveform.

In addition, the amount of slot liner insulation will be significantly less than conventional single stator, single rotor multi-phase servo motors. Slot liner insulation is placed inside of a slot to separate conductor wires and avoid a short. By increasing the size of corner slots, more conductor wires may be placed in each slot By providing more room for conductor material in the slots of each of the four poles, and accordingly more conductor wires than insulation in a slot, heat is reduced.

In addition, the four pole arrangement lowers the electrical frequency at high shaft and rotor speeds than conventional servo motor designs incorporating six or more poles. Conventional servo motors typically utilize six or more poles to reduce the back iron and thus reduce the size of the motor. This results in reducing the rated continuous torque at higher speeds because of higher iron losses due to higher electrical frequencies by the increased poles/pole pairs. The four pole square multi-phase tandem rotor servo motor assembly does not reduce the rating of continuous torque at high speeds as much as conventional motor designs because of the lower frequency iron losses.

In addition, the high acceleration rotary actuator assembly has a better speed range than conventional servo motors. At high speeds, conventional servo motor drives will have to drive the inductance. This requires extra voltage to drive the inductance proportional to the electrical frequency. The four pole square tandem servo motor assembly has a lower electrical frequency at higher speeds than conventional servo motors incorporating six poles or more. This advantageously enables the high acceleration rotary actuator assembly to reach a greater maximum speed than conventional servo motors and accordingly a greater speed range.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A high acceleration rotary actuator motor assembly comprising:
a first phase motor element provided on a shaft, the first phase element including a first rotor carrying a plurality of magnets which alternate exposed poles, the first rotor being connected to the shaft and surrounded by a first stator formed of a plurality of interconnected segmented stator elements having a contiguous winding to form a plurality of magnetic poles;
a second phase motor element provided on the shaft a first distance from the first phase motor element, the second phase motor element including a second rotor carrying a plurality of magnets which alternate exposed poles, the second rotor being connected to the shaft and surrounded by a second stator formed of a plurality of interconnected segmented stator elements having a contiguous winding to form a plurality of magnetic poles;
a third phase motor element provided on the shaft a second distance from the second phase motor element, the third phase motor element including a third rotor carrying a plurality of magnets which alternate exposed poles, the third rotor being connected to the shaft and surrounded by a third stator formed of a plurality of interconnected segmented stator elements having a contiguous winding to form a plurality of magnetic poles;
the second rotor and magnets being offset about the shaft from the first rotor and magnets by thirty degrees of rotation;
the third rotor and magnets being offset about the shaft from the first rotor and magnets by sixty degrees of rotation; and
the first, second, and third phase elements being electrically isolated from one another.

2. The high acceleration rotary actuator motor assembly of claim 1, wherein the magnets of the first, second and third rotors are permanent magnets.

3. The high acceleration rotary actuator motor assembly of claim 2, wherein the permanent magnets of the first, second and third rotors each have a uniform radius around the shaft.

4. The high acceleration rotary actuator motor assembly of claim 1, wherein the cross-section of the stator of the first, second and third phase elements taken in a plane orthogonal to the axis of the shaft is square in shape.

5. The high acceleration rotary actuator motor assembly of claim 1 wherein the first, second and third phase elements each produce a square waveform torque constant.

6. The high acceleration rotary actuator motor assembly of claim 1, wherein the first phase element receives a first phase of a three-phase electric current, the second phase element receives a second phase of a three-phase electric current, and the third phase element receives a third phase of a three-phase electric current.

7. The high acceleration rotary actuator motor assembly of claim 1, wherein each of the segmented stator elements of the first, second and third phase motor elements includes a longitudinal member and a perpendicular member connected as a unitary element, the longitudinal member having parallel sides separated by first and second ends, the perpendicular member being orthogonal to and bisecting the longitudinal member, the perpendicular member having an arcuate end opposite the longitudinal member, the first end defines a receiving aperture and the second end includes an attachment post, wherein the receiving aperture is adapted to receive the receiving post of a second segmented stator element and the attachment post is adapted to be received by the receiving aperture of a third segmented stator element.

8. The high acceleration rotary actuator motor assembly of claim 1, wherein the first stator is in electrical communication with a first phase of an electric drive unit, the second stator is in electrical communication with a second phase of the electric drive unit, and the third stator is in electrical communication with a third phase of the electric drive unit.

9. The high acceleration rotary actuator motor assembly of claim 1, wherein the poles of the first stator exert a magnetic force upon the magnets carried by the first rotor when the poles are electrically charged by an electric drive unit, the poles of the second stator exert a magnetic force upon the magnets carried by the second rotor when the poles are electrically charged by the electric drive unit, and the poles of the third stator exert a magnetic force upon the magnets carried by the third rotor when the poles are electrically charged by the electric drive unit.

10. A high acceleration rotary actuator motor assembly comprising:
a shaft carrying a first phase motor element spaced a first distance from a second phase motor element, a third phase motor element spaced a second distance from the second phase motor element, and a fourth phase motor element spaced a third distance from the third phase motor element;
a four pole winding provided in each stator of each phase motor element;
a first rotor connected to the shaft in the first phase motor element;
a second rotor connected to the shaft in the second phase motor element, the second rotor is provided on the shaft $\pi/8$ radians offset from the first rotor;
a third rotor connected to the shaft in the third phase motor element, the third rotor is provided on the shaft $\pi/4$ radians offset from the first rotor; and
a fourth rotor connected to the shaft in the fourth phase motor element, the fourth rotor is provided on the shaft $3\pi/8$ radians offset from the first rotor.

11. The high acceleration rotary actuator motor assembly of claim 10, wherein the stators of the first, second, third and fourth first phase motor elements have a square cross-sectional profile taken perpendicular to the axis of rotation of the shaft.

12. The high acceleration rotary actuator motor assembly of claim 10, further comprising:
a first electric drive unit in electric communication with the first phase motor element;
a second electric drive unit in electric communication with the second phase motor element;
a third electric drive unit in electric communication with the third phase motor element; and
a fourth electric drive unit in electric communication with the fourth phase motor element, wherein the first, second, third and fourth phase motor elements are electrically isolated from one another.

13. The high acceleration rotary actuator motor assembly of claim 10, wherein the first, second, third and fourth rotors each include a plurality of magnets.

14. The high acceleration rotary actuator motor assembly of claim 13, wherein the magnets of the first, second, third and fourth rotors are permanent magnets.

15. The high acceleration rotary actuator motor assembly of claim 14, wherein the permanent magnets of the first, second, third and fourth rotors have a uniform radius around the shaft.

16. The high acceleration rotary actuator motor assembly of claim 14, wherein the first, second, third and fourth rotors each have four permanent magnets alternating in exposed pole around the shaft.

17. The high acceleration rotary actuator motor assembly of claim 10, wherein the first phase element receives a first phase of a four-phase electric current, the second phase element receives a second phase of the four-phase electric current, the third phase element receives a third phase of the four-phase electric current, and the fourth phase element receives a fourth phase of the four-phase electric current.

18. A high acceleration rotary actuator motor assembly comprising:
a shaft carrying a first phase motor element, a second phase motor element, and a third phase motor element provided in tandem on the shaft;
a four pole winding provided in each stator of each phase motor element;
a first rotor connected to the shaft in the first phase motor element, the first rotor carrying four permanent magnets of a uniform radius and alternating in exposed pole around the shaft;
a second rotor connected to the shaft in the second phase motor element, the second rotor carrying four permanent magnets of a uniform radius and alternating in exposed pole around the shaft, the permanent magnets of the second rotor being provided on the shaft $\pi/6$ radians offset from the magnets of the first rotor; and
a third rotor connected to the shaft in the third phase motor element, the third rotor carrying four permanent magnets of a uniform radius and alternating in exposed pole around the shaft, the permanent magnets of the third rotor being provided on the shaft $\pi/3$ radians offset from the magnets of the first rotor.

* * * * *